United States Patent [19]
Vinciarelli et al.

[11] Patent Number: 5,805,434
[45] Date of Patent: Sep. 8, 1998

[54] CONTROL OF STORED MAGNETIC ENERGY IN POWER CONVERTER TRANSFORMERS

[75] Inventors: Patrizio Vinciarelli, Boston; Jay Prager, Tyngsboro, both of Mass.

[73] Assignee: VLT Corporation, San Antonio, Tex.

[21] Appl. No.: 862,528

[22] Filed: May 23, 1997

Related U.S. Application Data

[63] Continuation of Ser. No. 373,112, Jan. 17, 1995, abandoned.

[51] Int. Cl.$^6$ ............................. H02M 3/336; H02M 1/12
[52] U.S. Cl. ................................. 363/16; 363/21; 363/41
[58] Field of Search ................................. 363/16, 20, 21, 363/41

[56] References Cited

U.S. PATENT DOCUMENTS

| | | | |
|---|---|---|---|
| 4,441,146 | 4/1984 | Vinciarelli | 363/20 |
| 4,611,267 | 9/1986 | McMurray | 363/58 |
| 4,975,821 | 12/1990 | Lethellier | 363/21 |
| 5,019,957 | 5/1991 | Wilkinson | 363/56 |
| 5,038,264 | 8/1991 | Steigerwald | 363/21 |
| 5,111,372 | 5/1992 | Kameyama et al. | 363/20 |
| 5,282,123 | 1/1994 | Boylan et al. | 363/21 |
| 5,424,933 | 6/1995 | Illingworth | 363/21 |
| 5,434,768 | 7/1995 | Jitaru et al. | 363/21 |
| 5,469,096 | 11/1995 | Nessi et al. | 327/112 |
| 5,486,752 | 1/1996 | Hua et al. | 323/222 |

FOREIGN PATENT DOCUMENTS

| | | | |
|---|---|---|---|
| 0 350 297 A2 | 10/1990 | European Pat. Off. | H02M 3/335 |
| 41 21 942 A1 | 7/1993 | Germany | H02M 3/28 |

OTHER PUBLICATIONS

S. Hayes, "A Design Technique for Optimizing the Power Device Utilization in Feed–Forward Converters", Power Concepts, Inc. 1981, Proceedings of Powercom 8, pp. 1–9.

Leu et al., "Comparison of the Forward Circuit Topologies with Various Reset Schemes", Proceedings of the Virginia Power Electronics Center Seminar, Blacksburg, VA, Sep. 15–17, 1991, pp. 101–109.

*Primary Examiner*—Peter S. Wong
*Assistant Examiner*—Bao Q. Vu
*Attorney, Agent, or Firm*—Fish & Richardson P.C.

[57] ABSTRACT

Apparatus (and a method) useful in a switching power converter having a transformer and a primary switch for connecting a DC input source to a primary winding of the transformer during a portion of each of a succession of converter operating cycles, the apparatus includes a reset capacitor and a reset switch. Reset circuitry cooperates with the reset switch to connect and disconnect the reset capacitor in a manner which provides for resetting the transformer and which allows a current having a non-zero average value to flow in the reset switch.

Another aspect is a method for limiting the slew rate in a switching power converter which includes a transformer and a reset circuit of the kind which non-dissipatively recycles the magnetizing energy stored in a transformer during each of a succession of converter operating cycles. The method includes sensing the magnetizing current which is flowing in said transformer, and allowing initiation of another converter operating cycle only if the magnetizing current meets a predefined criterion for safe converter operation. In embodiments of the invention the predefined criterion may be the magnetizing current passing through a predefined value, e.g., zero.

46 Claims, 19 Drawing Sheets

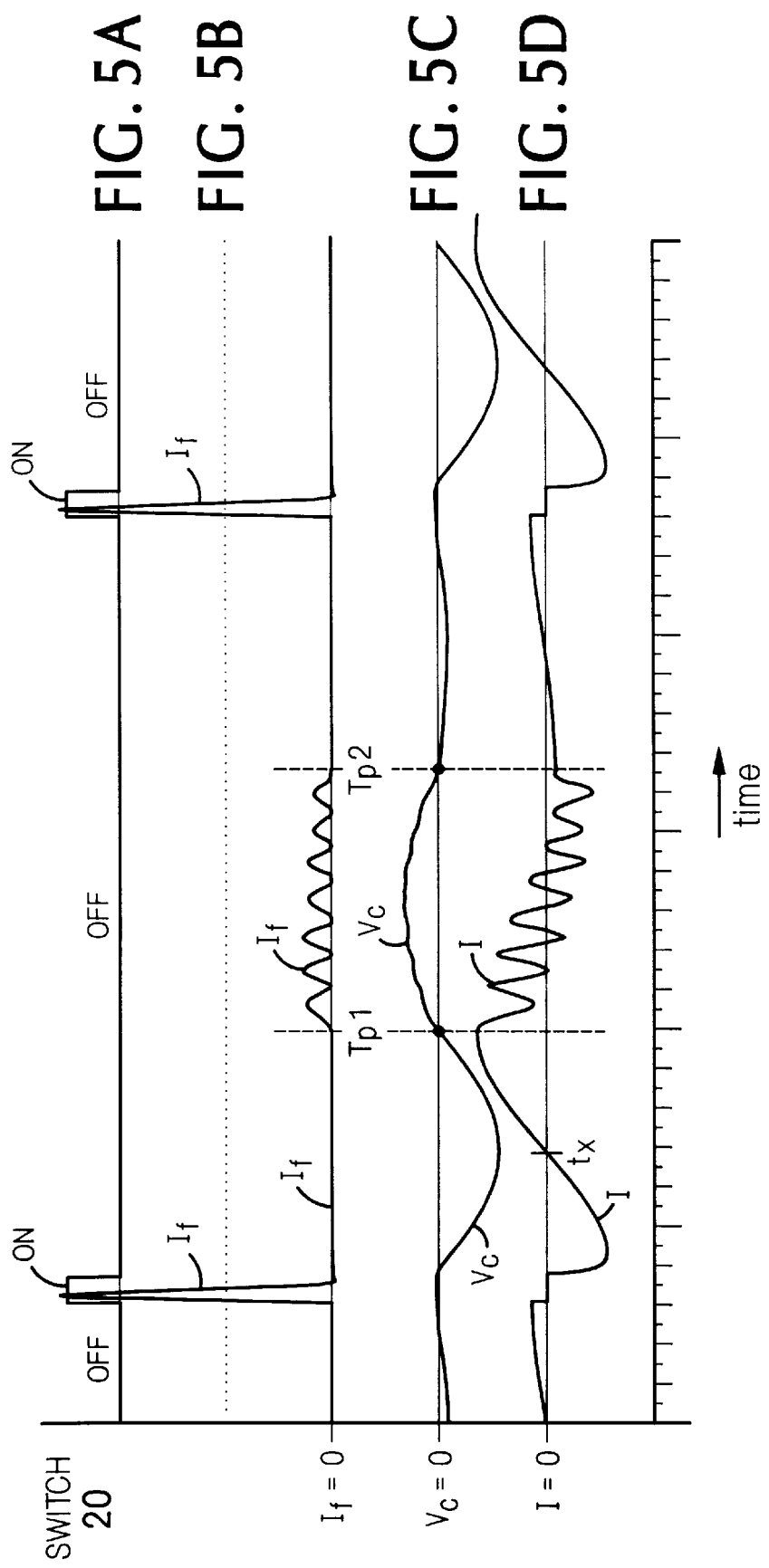

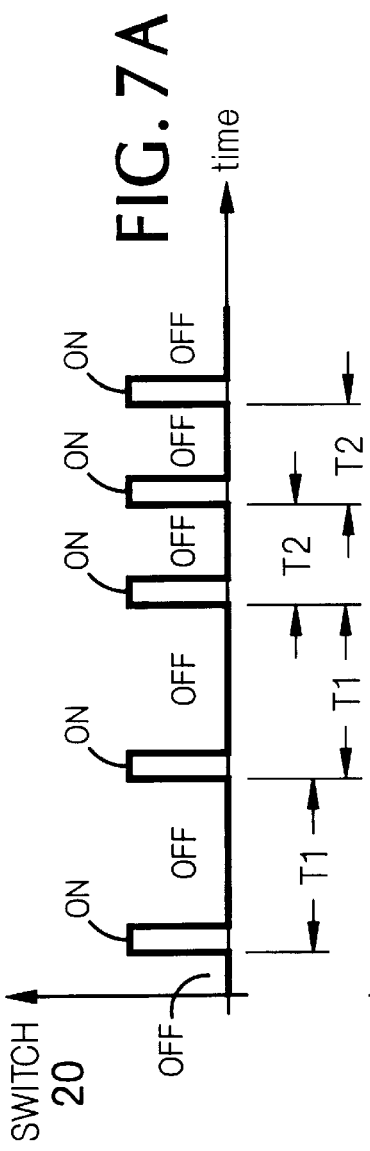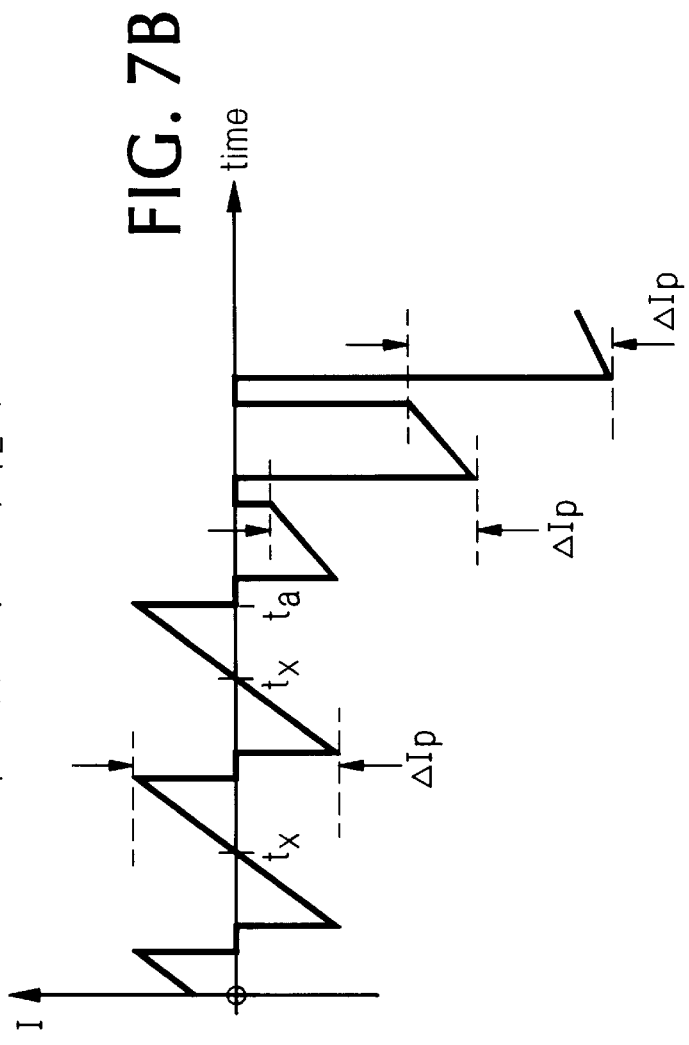

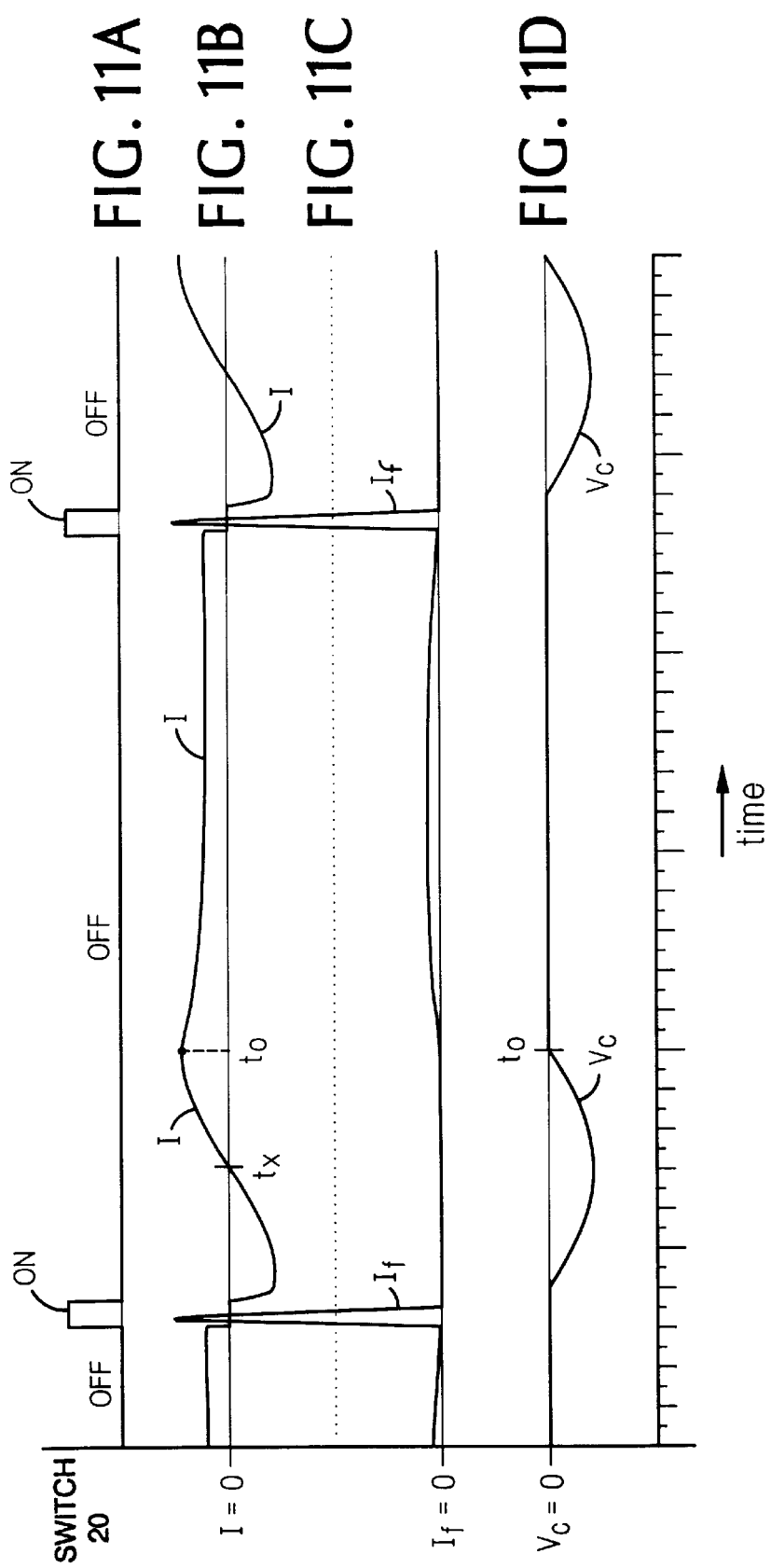

$T_{OP}$ = 20 MICROSECONDS

| | Cr = 0.1 µfarad | | Cr = 0.01 µfarad | |
|---|---|---|---|---|
| | FIG. 8 | FIG. 10 | FIG. 8 | FIG. 10 |
| | Cd=0.22 microfarad(35) Rd = 20 ohm(39) | Silicon Diode (350) | Cd=0.022 microfarad(35) Rd = 120 ohm(39) | Silicon Diode (350) |
| Pout | 15.3 Watts | 15 Watts | 17.3 Watts | 15.2 Watts |
| Preset | 2.43 Watts | 0.43 Watts | 2.72 Watts | 0.53 Watts |
| Pd | 2.38 Watts | 0.38 Watts | 2.69 Watts | 0.49 Watts |

FIG. 12A $T_{OP}$ = 3 MICROSECONDS

| | Cr = 0.1 µfarad | | Cr = 0.01 µfarad | |
|---|---|---|---|---|
| | FIG. 8 | FIG. 10 | FIG. 8 | FIG. 10 |
| | Cd=0.22 microfarad(35) Rd = 20 ohm(39) | Silicon Diode (350) | Cd=0.022 microfarad(35) Rd = 120 ohm(39) | Silicon Diode (350) |
| Pout | 217 Watts | 217 Watts | 217 Watts | 217 Watts |
| Preset | 0.1 Watts | 0.04 Watts | 3.02 Watts | .06 Watts |
| Pd | 0.08 Watts | 0.03 Watts | 3.0 Watts | 0.03 Watts |

FIG. 12B 5,805,434

CONTROL OF STORED MAGNETIC ENERGY IN POWER CONVERTER TRANSFORMERS

This is a continuation of application Ser. No. 08/373,112, filed Jan. 17, 1995, now abandoned.

BACKGROUND OF THE INVENTION

This invention relates to control of stored magnetic energy in power converter transformers.

In one class of power converters, called single-ended switching power converters (10, FIG. 1), a primary switching element 20 is used to repetitively connect an input source to the primary winding 329 of a power transformer 25 (FIG. 1) during a portion of each of a series of converter operating cycles. In some such converters, called "single-ended forward converters," forward energy transfer from the input source toward the load occurs during the time that the switch is closed. In other topologies, called "single-ended flyback converters", energy is stored in the transformer during the time that the switch is closed and is transferred forward to the load after the switch is opened. In yet other single-ended converters a portion of the energy may be transferred during both the on and off times of the switch. In general, practical converters of this kind must incorporate circuitry for managing the effects of magnetic energy storage in the transformer. For example, in converters in which energy is transferred forward during the on-time of the switch, circuitry is typically included to deal with the magnetizing energy which is stored in the transformer at the time that the switch is opened (e.g., to provide means for "resetting" the transformer); more generally, the effects of magnetic energy storage in the leakage inductance of the transformer must also be managed, e.g., to prevent the energy stored in the leakage field from overstressing the switch when the switch is turned off.

A wide variety of reset circuits (also called core reset circuits because almost all switching power converter transformers include a magnetic core), for use in single-ended forward converters, are described in the literature. These circuits differ in terms of their efficiency, cost and impact on converter power density. One such circuit 15, shown in FIG. 2, is described in Clemente, et al., "A Universal 100 KHz Power Supply Using a Single HEXFET," International Rectifier Corporation Applications Note AN-939, December 1980. One of the advantages of this circuit is that it can maintain the minimal value of peak switch voltage consistent with converter input voltage and duty cycle; one of its disadvantages is that it is dissipative and therefore compromises both converter efficiency and power density. Another circuit 30, of the kind described in Vinciarelli, "Optimal Resetting of the Transformer's Core in Single Ended Forward Converters," U.S. Pat. No. 4,441,146, (incorporated by reference) is shown in FIG. 3. This circuit has several advantages, among which are the following: (1) it, too, minimizes the peak voltage seen by the switch, (2) it provides for bipolar transformer 25 core excitation, thereby maximizing utilization of the available flux swing in the transformer's core and allowing for a smaller transformer, and (3) it is essentially lossless.

When used in single-ended forward converters, core reset circuits 15, 30 of the kinds shown in FIGS. 2 and 3 will also inherently control the effects of leakage energy by providing a capacitive sink which "snubs" (i.e., clamps) the effect of the release of the leakage energy on switch voltage. In other kinds of converters, single-ended or otherwise, circuits 15, 30 of the kinds shown in FIGS. 2 and 3 may be used solely as snubber circuits to manage and control the effects of stored leakage energy. For example, in flyback converters all of the magnetizing energy stored in the transformer 25 during the time that the primary switch 20 is closed is magnetically coupled into the transformer secondary winding and released to the load after the switch opens. While this provides a natural mechanism for reducing the magnetizing energy to zero it does not provide a mechanism for managing transformer 25 leakage energy, which can cause excessive switch 20 voltage when the switch 20 is opened. Circuits 15, 30 of the kinds shown in FIGS. 2 and 3 (the simplified converter schematics in the Figures can be modified to correspond to a single-ended flyback topology by simply reversing the polarity of one of the transformer 25 windings) can be used to clamp the voltage which might otherwise be caused by the stored leakage energy. For example, in Ogden, "Improved High Frequency Switching in Coupled Inductor Power Supplies," European Patent Application 0 350 297, a circuit essentially identical to that of the circuit 30 of FIG. 2 is used to both clamp the leakage inductance energy in a flyback converter and reroute it forward toward the load.

SUMMARY OF THE INVENTION

In an aspect, the invention features apparatus (and a method) useful in a switching power converter having a transformer and a primary switch for connecting a DC input source to a primary winding of the transformer during a portion of each of a succession of converter operating cycles, the apparatus includes a reset capacitor and a reset switch. Reset circuitry cooperates with the reset switch to connect and disconnect the reset capacitor in a manner which provides for resetting the transformer and which allows a current having a non-zero average value to flow in the reset switch.

Embodiments may include one or more of the following features. The reset circuitry may open and close the reset switch. The reset circuitry may cause the connecting and disconnecting to occur at times based on switching of the main switch. The reset switch may be connected in series with the capacitor. The reset circuitry may include circuit elements which inhibit bidirectional energy flow between the capacitor and the transformer. The apparatus may only allow transfer of magnetizing energy between the reset capacitor and the transformer if the polarity of the voltage across the reset capacitor is of a particular polarity. The apparatus may be connected in parallel with a winding on the transformer. The winding may be the primary winding, a secondary winding, or an auxiliary winding. The reset switch may be a unidirectional switch (e.g., a MOSFET) in parallel with a unidirectional conducting element (e.g., the intrinsic body diode of the MOSFET), the unidirectional switch and the unidirectional conducting element being arranged to conduct in opposite directions. The unidirectional switch may be a MOSFET in series with a series diode, the series diode and the MOSFET being poled to conduct in the same direction. The circuit elements may include a reset diode connected in parallel with the capacitor. Bidirectional energy flow may be allowed only if the voltage across the reset capacitor is of a particular polarity. The particular polarity may be that which will result in a reversal in the polarity of transformer magnetizing current during the time that the reset switch is closed. The reset circuitry may include circuit elements which inhibit bidirectional energy flow between the capacitor and the transformer. The circuit elements may include a reset diode connected across a series circuit comprising the reset capacitor and the series diode. The switching power converter may be a forward power converter, a zero-current switching converter, or a PWM converter. The reset circuitry may open the reset switch prior to the ON period of the primary switch, may close the reset switch during the OFF period of the primary switch, and may keep the reset switch open throughout the ON period of the primary switch.

In an aspect, the invention features a method for limiting the slew rate in a switching power converter which includes a transformer and a reset circuit of the kind which non-dissipatively recycles the magnetizing energy stored in a transformer during each of a succession of converter operating cycles. The method includes sensing the magnetizing current which is flowing in said transformer, and allowing initiation of another converter operating cycle only if the magnetizing current meets a predefined criterion for safe converter operation. In embodiments of the invention the predefined criterion may be the magnetizing current passing through a predefined value, e.g., zero. Among the advantages are the following. Resonance between the transformer and the reset capacitor is inhibited. Very low dissipation is achieved. The selection of Cr can be made based solely on the operating requirements of the converter.

Other aspects, features, and advantages will become apparent from what follows.

BRIEF DESCRIPTION OF THE DRAWING

FIGS. 5A through 5D show additional operating waveforms for the circuit of FIG. 3.

FIGS. 7A and 7B show the effect of a sudden change in operating frequency on the waveform of FIG. 4C.

FIGS. 11A through 11D show operating waveforms for the converter of FIG. 10.

FIGS. 12A and 12B show tables which compare losses in the damped reset circuit of FIG. 8 to the improved reset circuit of FIG. 10.

DESCRIPTION OF THE PREFERRED EMBODIMENTS

Figure 1:
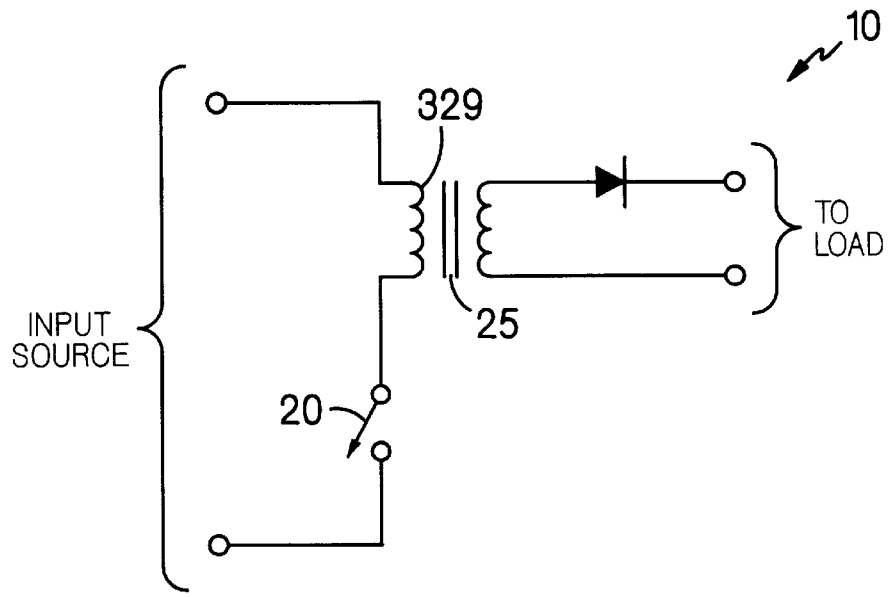
FIG. 1 shows a schematic of a single-ended switching power converter.
Figure 2:
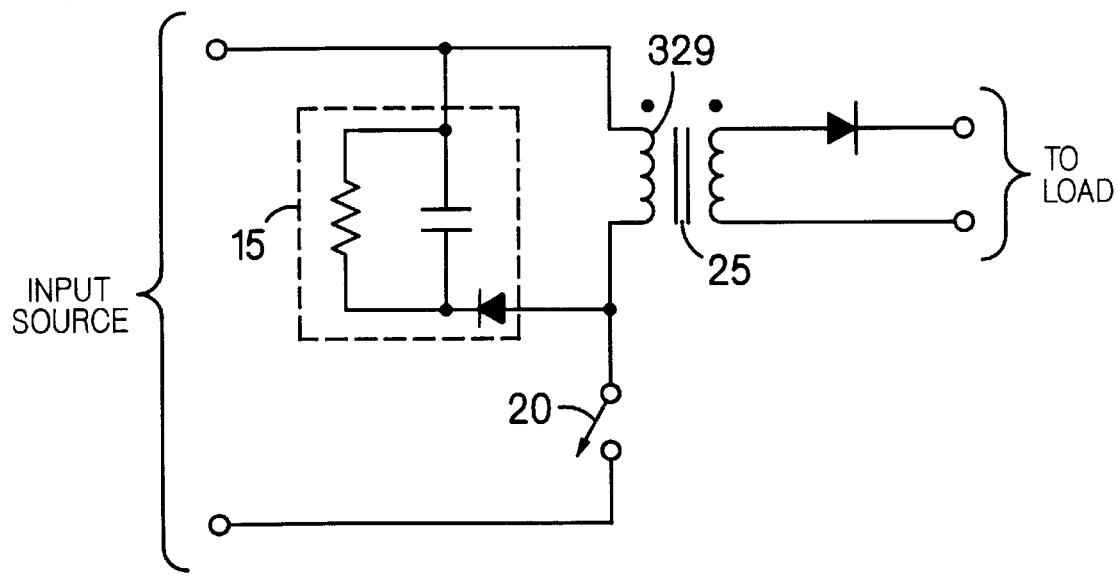
FIG. 2 shows a schematic of a converter which includes a dissipative prior art circuit useful for performing transformer resetting and snubbing.
Figure 3:
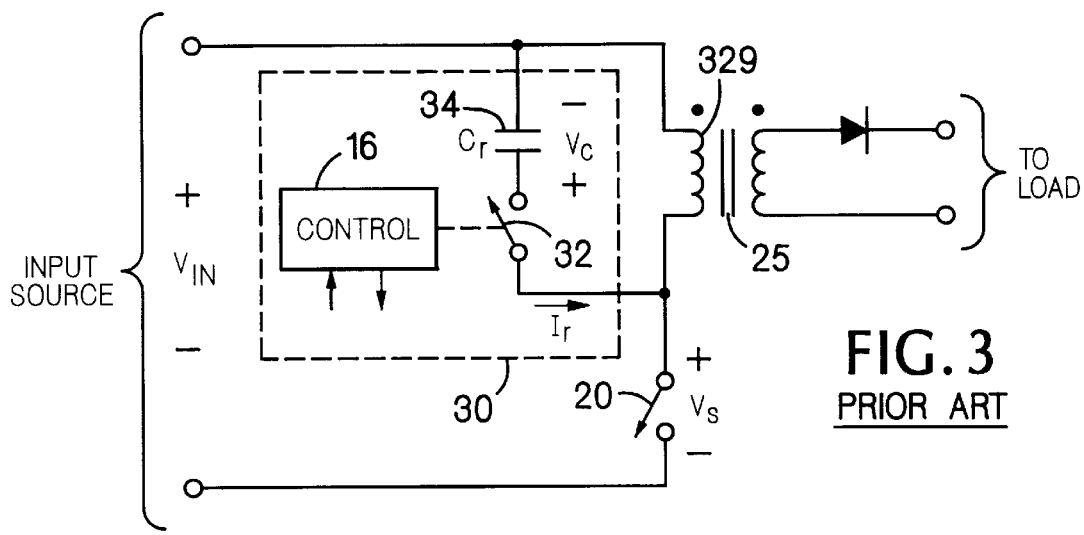
FIG. 3 shows a schematic of a converter which includes a non-dissipative prior art circuit topology which is useful for performing transformer resetting and snubbing.
Figure 4A:
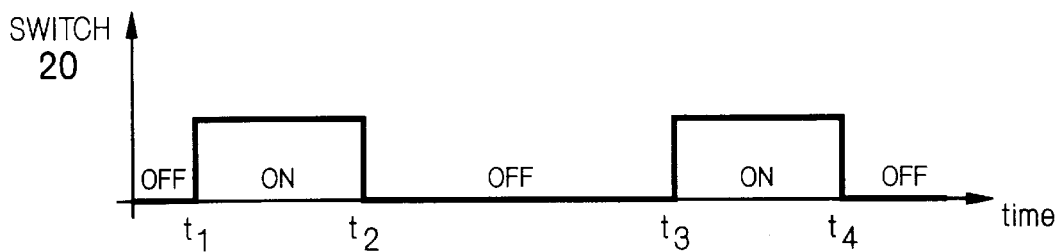
FIGS. 4A through 4C show operating waveforms for the circuit of FIG. 3.
Figure 4B:
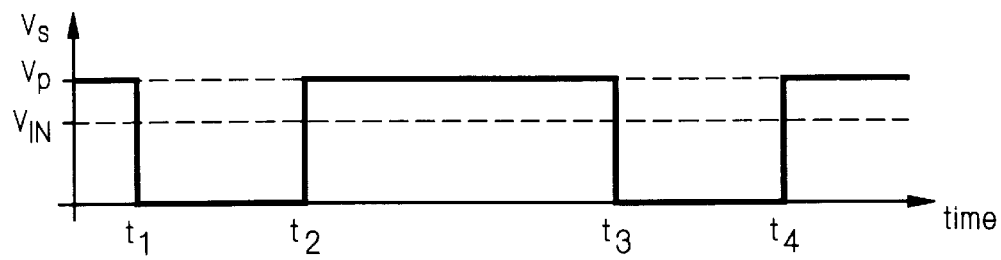
Figure 4C:
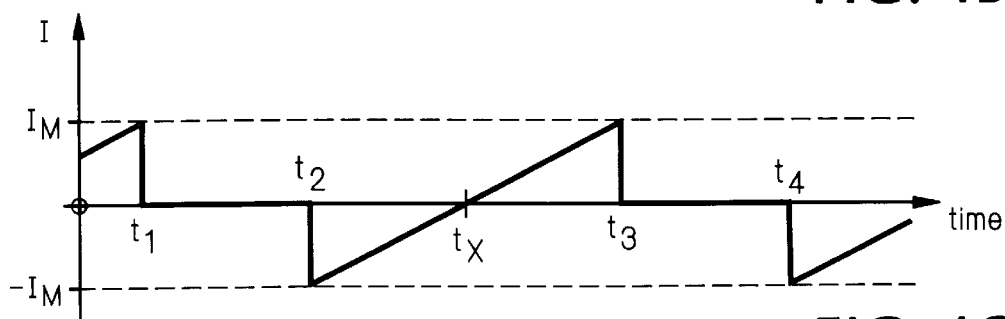

Waveforms for the core reset circuit 30 of FIG. 3 in a single ended forward converter under steady-state operating conditions are shown in FIGS. 4A through 4C, assuming ideal circuit components and a reset capacitor 34 of sufficiently large value, Cr, so that the characteristic frequency, fr, of the resonant circuit consisting of the reset capacitor 34 and the magnetizing inductance of the transformer 25 (of value Lm) is well below the converter operating frequency, fop (e.g., fr<<fop, where fr=1/(2*pi*sqrt(Lm*Cr) and fop= 1/(t3-t1)). When a primary switch 20, connected to a primary winding 329 of the transformer 25, is turned on, the reset switch 32 is off (by means of control circuitry 16) and vice versa. When the reset switch 32 is turned on at the end of an operating cycle (e.g., at time t=t2), energy stored as magnetizing current in the transformer (e.g., current I=–Im at time t2, FIG. 4C) is resonantly transferred to the capacitor 34 until, at time t=t3, at the beginning of the next converter operating cycle, the current has reversed (I=Im). Under a particular set of steady-state operating conditions (e.g., Vin and duty cycle, D=ton/toff) the capacitor voltage Vc will converge on a value equal to Vin*D and the peak voltage seen by the switch, Vp (FIG. 4B), will be equal to Vin+Vc= Vin(1+D). Since Tr=1/fr is assumed to be large relative to the operating period of the converter, both of these voltages will be essentially constant throughout the time that the primary switch is open and the peak voltage seen by the switch 20 will therefore be minimized.

Core reset circuits of the kind shown in FIG. 3 offer several important benefits. Recirculation of energy between circuit elements allows these circuits to operate as magnetizing current "mirrors," producing both a current and flux reversal during the reset interval (e.g., t=t2 to t=t3). As a result, circuits of this kind not only minimize loss, but effectively double the available "volt-time" product of the core and allow for an approximately two-fold reduction in the size of the core.

Because the core reset circuit of FIG. 3 is based upon a resonant circuit, however, steps must be taken to prevent resonant effects from adversely affecting converter operation. In practical switching power converters, for example, neither the input voltage, Vin, nor the duty cycle, D, will be constant and, as a result, the average value of the voltage Vc will vary with changes in Vin and D. For a circuit 30 of the kind shown in FIG. 3, however, changes in the average value of Vc may be accompanied by a persistent oscillation in Vc at the resonant frequency fr.

Figure 6:
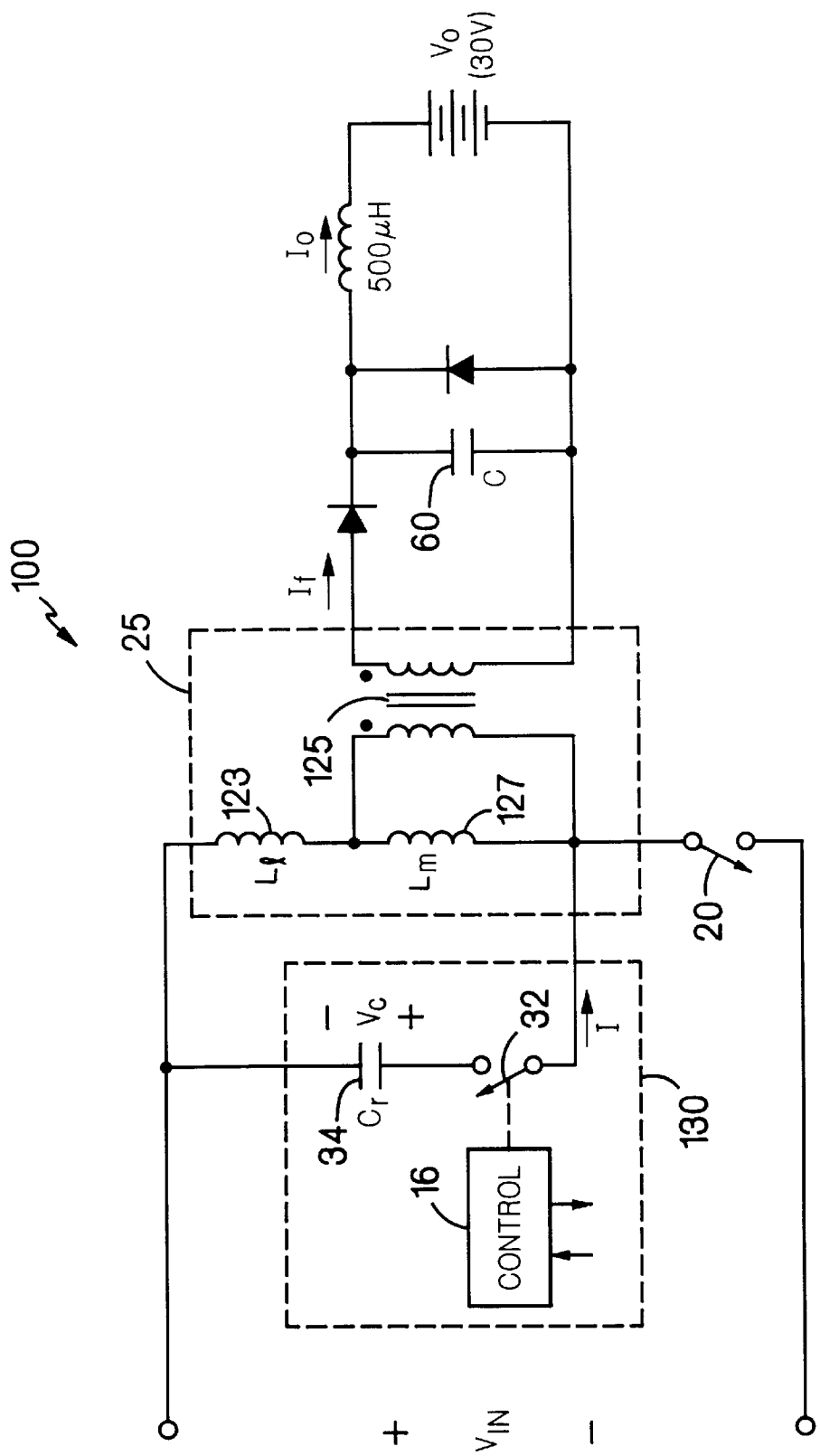
FIG. 6 shows a schematic of a single-ended zero-current switching converter which includes a reset circuit of the kind shown in FIG. 3.

In converters in which operating frequency varies (e.g., in zero-current switching (ZCS) converters of the kind described in Vinciarelli, "Forward Converter Switching at Zero Current," U. S. Pat. No. 4,415,959, incorporated by reference) additional problems may arise, especially as the converter operating frequency drops to values comparable to, or below, the frequency fr. In such cases, the waveforms of FIG. 4 will no longer apply. Rather, as illustrated in FIGS. 5A through 5D (for a zero-current switching converter having an equivalent circuit and the equivalent circuit values shown in FIG. 6 operating at a frequency, fop=50 KHz, which is below the characteristic frequency of the reset circuit 130, fr=84 KHz) both the reset capacitor voltage, Vc (FIG. 5C), and the magnetizing current, I (FIG. 5D) rise and fall sinusoidally and assume both positive and negative values (although, as described earlier for higher converter operating frequencies, the average value of the capacitor voltage, Vc, over a time period which is long compared to a converter operating cycle and under steady state operating conditions, will still be approximately equal to Vin*D). With reference to FIGS. 5B and D and FIG. 6, during time periods that the voltage Vc goes positive (e.g., between times tp1 and tp2, FIG. 5) energy can be transferred from the reset circuit 30 via the transformer 25 forward to the converter load. This will effectively cause a change in the open-loop gain of the converter and can contribute to, or cause, closed-loop instability. In addition, oscillation in the reset circuit 30 may generally result in undesirable coupling of energy into the converter output in the form of noise at the frequency fr, or, as seen in FIGS. 5B through 5D, at a higher frequency associated with resonant ringing of the transformer leakage inductance (L1, 123, FIG. 6) with both the reset capacitor 34 and the secondary capacitor 60 during the time period that the voltage Vc is positive.

Another characteristic of the circuit of FIG. 3 is that the maximum allowable converter slew rate (e.g., the rate-of-change of duty cycle), and hence converter response time, are reduced as the value of Cr is increased. This is illustrated in FIGS. 7A and 7B for a circuit 30 of the kind shown in FIG. 3 operating in a variable frequency converter. As indicated in the Figures, the converter operating period is T1 until time t=ta, after which the period decreases sharply to a lower value T2. If the reset capacitor 34 is assumed to be large enough so that the voltage across the capacitor, Vc, cannot change substantially over a time span corresponding to several converter operating cycles, then the peak variation in magnetizing current, ΔIp, during the OFF times of the primary switch 20 will not change substantially over the same time span. Under these circumstances, a sufficiently large reduction in operating period will, as illustrated in FIG. 7B, result in a cycle-by-cycle increase in the peak negative excursion of the magnetizing current, I, sufficient to cause transformer saturation within a few operating cycles. Smaller values of Cr allow for greater cycle-by-cycle adaptation in Vc which, in turn, would allow for faster duty cycle slewing and faster converter response time. The same principle applies in a constant frequency, pulse-width modulated (PWM) converter.

Figure 8:
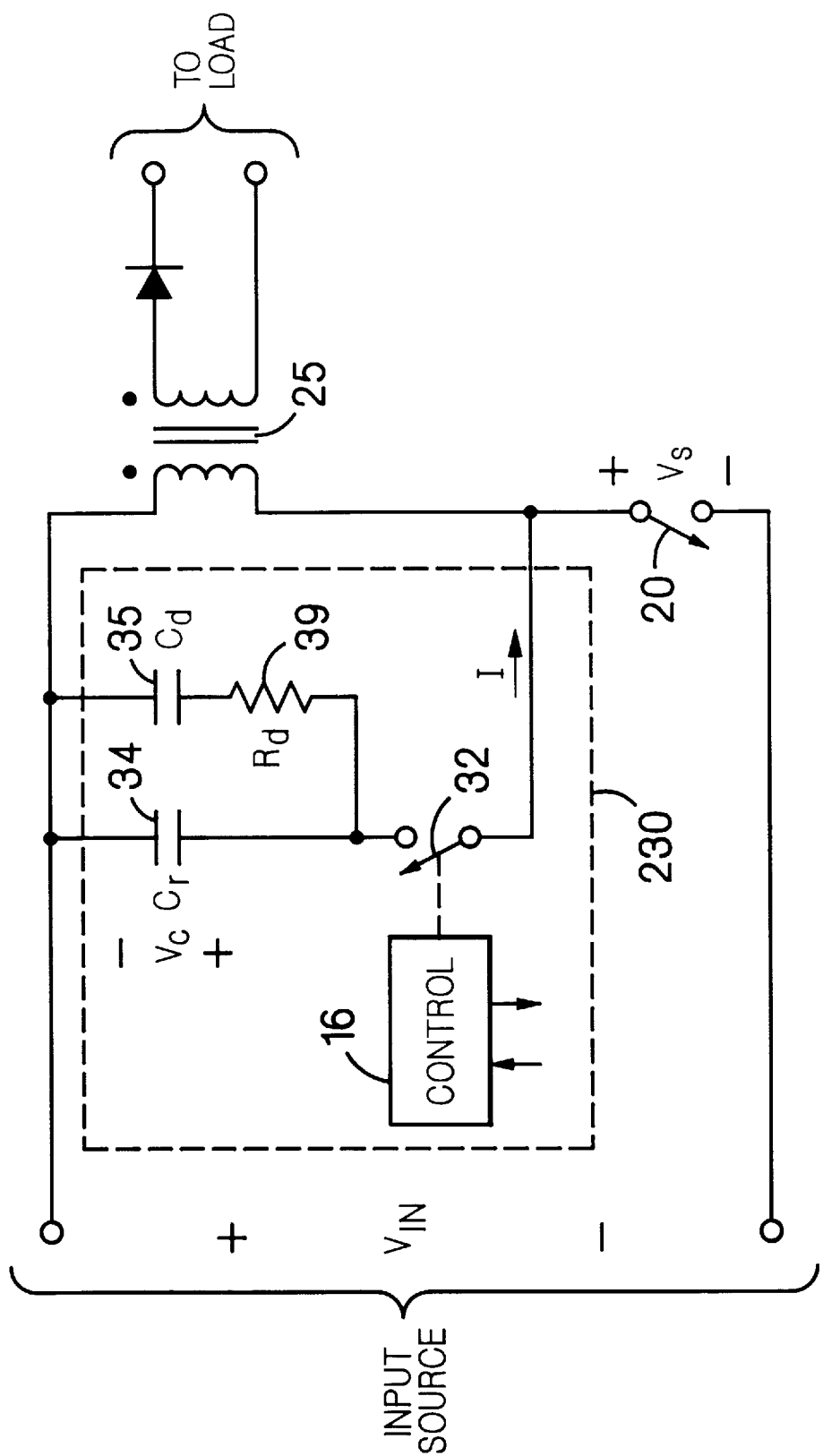
FIG. 8 shows a schematic of a single-ended converter which includes a prior art damped reset circuit topology.

One way to minimize the effects of resonance in the reset circuit of FIG. 3 is to damp the circuit, as illustrated in FIG. 8. In the Figure, the damped reset circuit 230 is identical to the circuit of FIG. 3 except that a passive damper, consisting of a damper resistor 39 and damper capacitor 35, has been connected across the reset capacitor 34. The damper resistor will dissipate energy at frequencies for which the impedance of Cd is low compared to Rd and for which the impedance of Cr is not low relative to Rd. Thus, at both very low and very high frequencies the damper creates little loss. In FIGS. 9A through 9D, for example, waveforms are shown for the converter of FIG. 6 with the undamped reset circuit 130 replaced with the damped reset circuit 230 of FIG. 8. Circuit values are Cr=0.1 microfarad, Cd=0.22 microfarad, and Rd=20 ohms. Comparing the waveforms of FIG. 9 to those of FIG. 5 indicates that both the resonant reset circuit oscillations and the parasitic high frequency oscillations have been significantly reduced. Power flow from the reset circuit to the load has also been substantially reduced.

Effective damping has been achieved by setting the value of the damper capacitor, Cd, to approximately two times the value of Cr, and setting the damper resistor value, Rd, so that the damper frequency, fd=1/Rd*Cd, is equal to about one-half the undamped characteristic frequency fr. To avoid excessive dissipation in the damper resistor, fr is chosen to be well below (e.g., approximately 10% of) the maximum operating frequency of the converter since this puts the "normal" operating frequency range of the converter well above fr and provides for minimum damper dissipation in this range. Thus, the characteristic frequency, fr, of a ZCS converter operating at frequencies up to 1 MHz (or of a constant frequency PWM converter operating at a similar frequency) would be set to be near 100 KHz. This provides effective damping with relatively little power loss at converter operating frequencies well above fr.

In practice, however, use of the damped reset circuit requires balancing several sometimes conflicting requirements. On the one hand, use of a low value for Cr is generally desirable as it provides for a higher allowable converter slew rates and increases the value of fr above the crossover frequency of the converter. On the other hand, low values of Cr result in increased dissipation in the damper resistor. For example, if the damped reset circuit 230 of FIG. 8 is used in place of the undamped circuit 130 in the ZCS converter of FIG. 6, and if Cr=0.1 microfarad, Cd=0.22 microfarad, and Rd=20 ohms, then, as indicated in the table in FIG. 12B, the dissipation in the damper resistor 39 at an operating period Top=3 microseconds (with the converter delivering 217 Watts) is approximately Pd=80 milliwatts. When the operating frequency is reduced to 50 KHz (with the converter delivering 15 Watts), the dissipation, indicated in the table of FIG. 12A, rises to approximately Pd=2.4 Watts. If, however, the component values are adjusted to Cr=0.01 microfarad, Cd=0.22 microfarad and Rd=120 ohms, which provides the same damping at a higher value of fr, then, as indicated in the Table of FIG. 12B, the dissipation at Top =3 microseconds rises to Pd=3.0 Watts and the dissipation at 50 KHz (Table of FIG. 12A) rises to 2.7 Watts. Thus, while the lower value of Cr would allow for improvement in converter response time it would also result in an unacceptable increase in power loss (e.g., the additional 3 Watts of loss at 217 Watts represents an approximate reduction in conversion efficiency of 1.5%).

Figure 10:
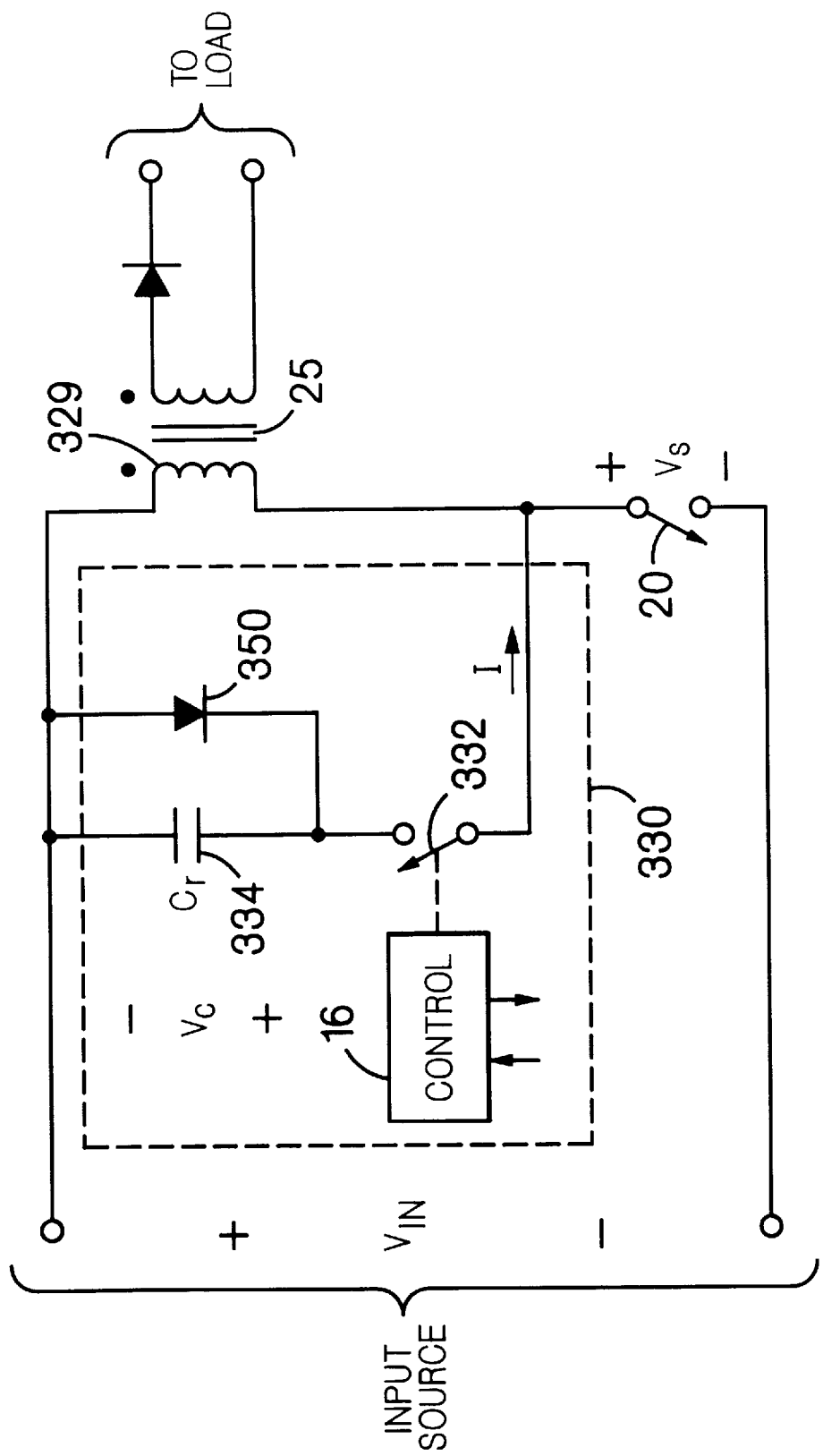
FIG. 10 shows a schematic of a single-ended converter which includes an improved reset circuit topology according to the present invention.

FIG. 10 shows a single-ended converter which includes an improved reset circuit 330. Like the circuits of FIGS. 3 and 8, the reset switch 332 is opened when the primary switch is closed and vice versa. The improved reset circuit 330 differs from the circuits of FIGS. 3 and 8 by including a diode 350 connected across the reset capacitor 334. By poling the diode as shown, so that the reset capacitor can support positive values of the voltage Vc but cannot support negative values, the diode effectively prevents resonance (e.g., bidirectional energy transfer) from occurring between the reset capacitor 334 and the magnetizing inductance of the transformer 25.

Figure 9:
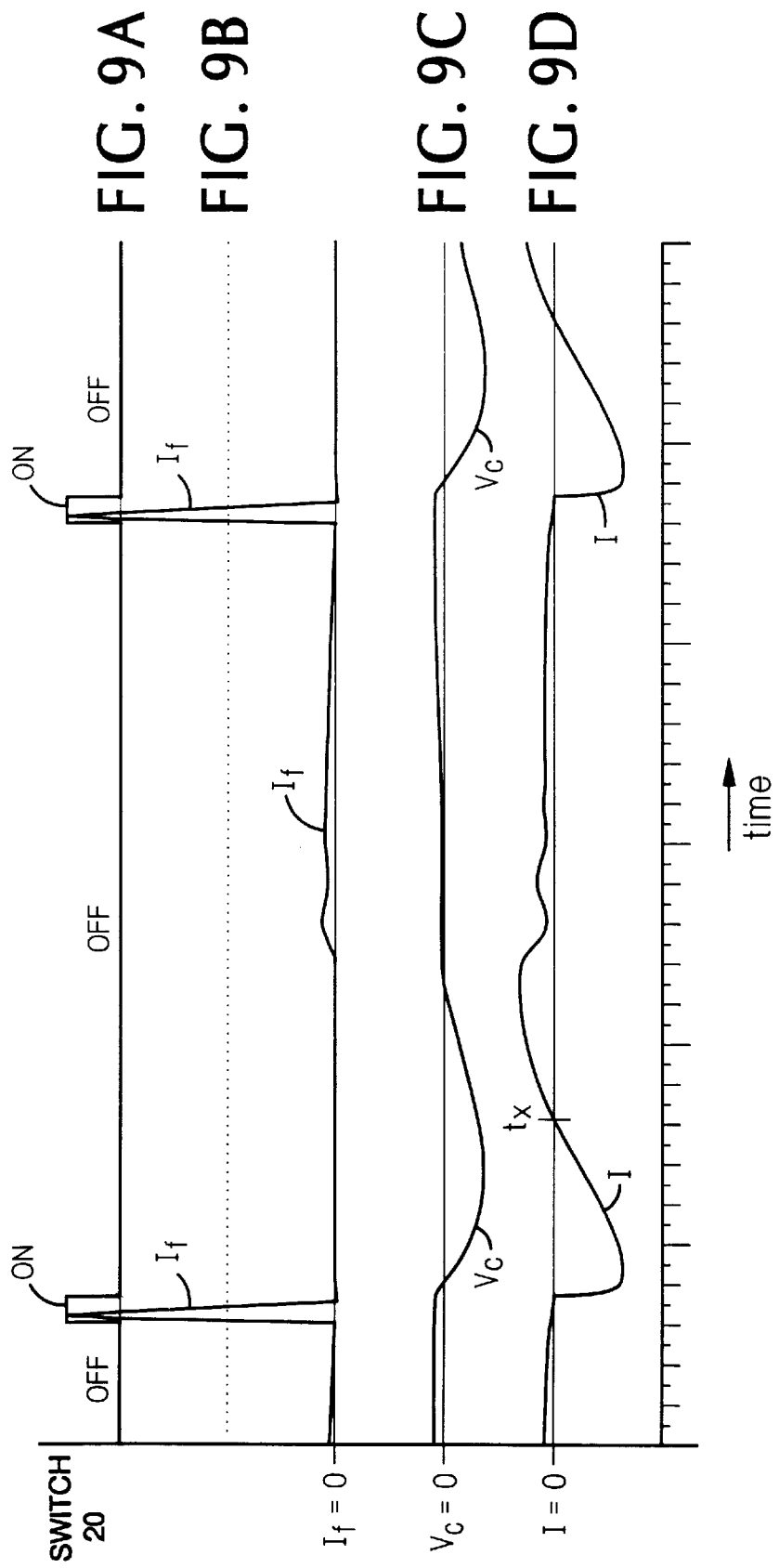
FIGS. 9A through 9D show operating waveforms for the converter of FIG. 8.

The beneficial effects of the diode in preventing resonance may be seen, in part, by comparing the waveforms in FIG. 11 to those in FIGS. 9 and 5. In FIG. 11, waveforms are shown for the converter of FIG. 6 in which the undamped reset circuit 130 is replaced with the improved reset circuit 330 of FIG. 10. The reset capacitor 334 value is Cr=0.1 microfarad. Comparing FIGS. 11A through 11D with the corresponding waveforms of FIGS. 9 and 5 it can be seen that the waveforms in the improved circuit are better behaved and more predictable than the waveforms in the other Figures—neither Vc (FIG. 11) nor I (FIG. 11B) show sustained oscillations, either at the characteristic frequency, fr, or at higher frequencies; the absence of the higher frequency oscillation is also an indicator that forward power flow from the reset circuit to the load has been eliminated. FIG. 11D also clearly shows that the reset capacitor voltage does not assume positive values. Rather, as Vc passes through zero volts (e.g., after t=to, FIG. 11) the diode 350 becomes conductive, resonant energy transfer is terminated and the diode 350 conducts the magnetizing current I (FIG. 11B) until the beginning of the next operating cycle. The decay in the current I in FIG. 11B is due to the non ideal characteristics (e.g., parasitic resistances or finite voltage drops) of the diode 350, switch 332, and transformer primary winding 329—if all circuit elements were ideal, the current I would remain unchanged until the next operating cycle. (In all of the circuits of FIGS. 10, 8 and 6 the parasitic resistances of the reset switches 332, 32 is 0.1 ohm; the parasitic resistance of the transformer primary winding (e.g., primary winding 329 is 0.5 ohm; the diode 350, where used, is a silicon device). As in the reset circuits of FIGS. 3 and 8, the average value of the capacitor voltage, Vc, in the circuit of FIG. 10, over a time frame which is long with respect to a converter operating cycle and under steady-state operating conditions, will be approximately equal to Vin*D. At converter operating frequencies which are substantially higher than the characteristic frequency fr, the diode 350 will not become conductive and the waveforms for the reset circuit of FIG. 10 will revert to those shown in FIG. 4 for the prior art circuit of FIG. 3.

While selection of the value of the reset capacitor in the damped reset circuit (FIG. 8) involved tradeoffs between response time and dissipation, these tradeoffs do not apply to the improved circuit 330 of FIG. 10. The improved circuit exhibits such markedly lower dissipation that the value of Cr may be chosen solely on the basis of desired converter performance criteria (e.g., response time) and the peak voltage limits imposed by the converter switches. This is indicated in the Tables of FIGS. 12A and 12B in which losses in the improved reset circuit of FIG. 10 are compared to losses in the damped reset circuit of FIG. 8 for different values of damper components (35, 35, FIG. 8) and at different operating frequencies. In the Tables, Preset represents the total amount of power dissipated in the reset circuit (e.g., circuits 230, 330) and Pd represents the loss in the "resonance-control" components used in the particular circuit (e.g., damper resistor 39 in circuit 230; diode 350 in circuit 330). As discussed earlier, loss in the passive damper circuit is strongly influenced by the values of Cr, Cd and Rd, and reductions in Cr result in lower values of Cd and increased amounts of Pd and Preset. The values of both Preset and Pd in the improved reset circuit 330 are seen to be much lower than the corresponding losses in the passively damped circuit 230, and the value of loss is only weakly a function of the value of Cr. The dependence of Pd on operating frequency is a result of the increased peak-to-peak swing in the magnetizing current, I, flowing in the non ideal diode 350 at low converter operating frequencies. In practice, the losses are essentially insignificant. Of greatest importance is the fact that selection of the value of Cr in the improved reset circuit need not be traded off against circuit dissipation. Rather, the value of Cr in the improved circuit 330 may be selected based solely upon converter performance requirements (e.g., desired converter slew rates; input voltage and load range) and the voltage rating of the primary switch 20.

A fundamental and important difference between the prior art reset circuit topology 30 of FIG. 3 and the improved topology 330 of FIG. 10 is that the average value of the current, I, in the prior art topology must be zero, whereas in the improved topology the average value of I can assume values which are nonzero and positive in the direction of the arrow. This is because all of the current, I, in the topology of FIG. 3 must flow in the reset capacitor 34, and, as a result, the voltage Vc can only stabilize at an average value which is consistent with zero average flow of current I. In the improved topology, the diode 350 provides a path for supporting a positive average value of I. This is how resonance is prevented. In the topology of FIG. 3 resonant energy transfer results in the current I passing bidirectionally between the capacitor 34 and the magnetizing inductance of the transformer. In the topology of FIG. 10 this is impossible—as the voltage Vc (FIG. 10) attempts to go negative the diode 350 begins to bypass current around the capacitor 334, effectively replacing the capacitor with a short circuit. Energy in the magnetizing inductance is no longer transferred to the capacitor and the current, I, continues to flow in the inductor at an essentially constant value. As noted above, however, in non-ideal embodiments, losses in circuit elements will cause a decline in the value of I.

Figure 13A:
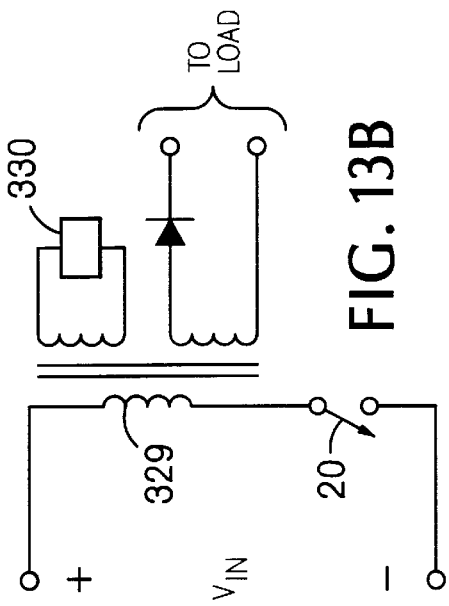
FIGS. 13A and 13B show schematics which indicate alternate connections for the reset circuits of FIGS. 3, 8 and 10.
Figure 13B:
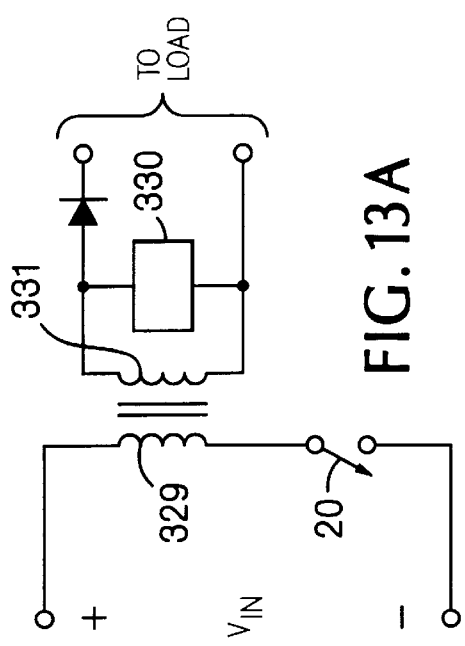

As shown in FIGS. 13A and 13B, the improved reset circuit 330 may be placed across a transformer winding other than the primary winding 329. For example, in FIG. 13A the circuit 330 is placed across the secondary winding 331 which delivers power to the load; in FIG. 13B it is placed across an auxiliary winding 341. A benefit of "direct-coupled" reset (e.g., as in FIG. 10, where the reset circuit 330 is directly across the winding which is connected to the primary switch 20) is that the reset circuit 330 automatically acts as a snubber for the primary switch when the switch is turned off. On the other hand, a benefit of the use of an auxiliary winding 341 (FIG. 13B) is that a single reset circuit embodiment (e.g., same value of reset capacitor, Cr; the same switch and diode) may be used within converters having widely varying values of both input and output voltage by simply adjusting the relative number of turns on the auxiliary winding to provide a predetermined value of transformer volts-per-turn. However, where the reset circuit 330 is connected in other than a direct-coupled configuration, the ability of the circuit to snub the primary switch 20 will be diminished by the leakage inductances between the windings. In such cases care must be used to ensure that the coupling between windings is sufficiently high to prevent excessive voltage spikes on the switch 20.

Figure 14:
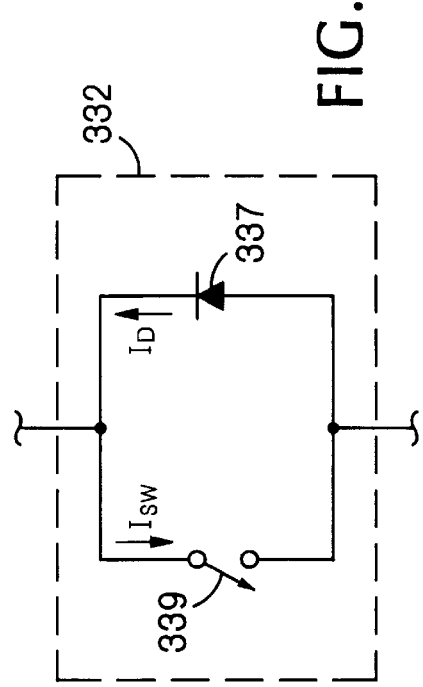
FIG. 14 shows an equivalent circuit of a switch for use in the circuit of FIGS. 3, 8 and 10.
Figure 15A:
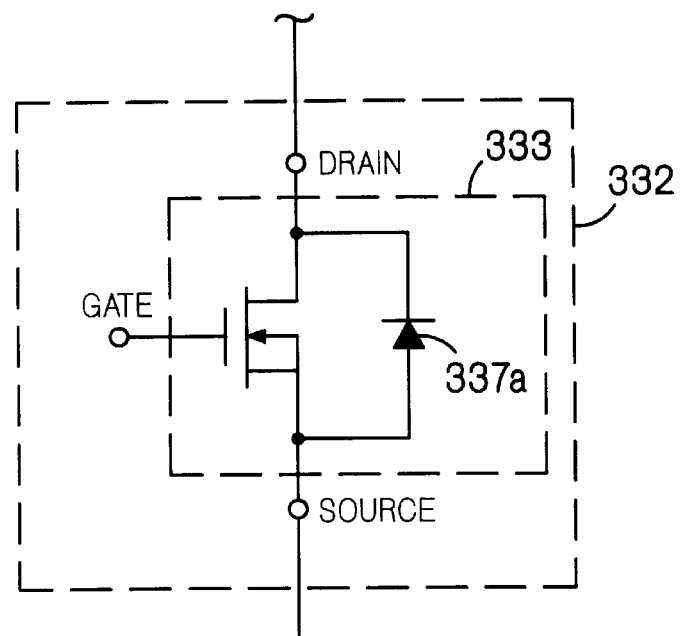
FIGS. 15A and 15B show embodiments of the switch of FIG. 14 which include a MOSFET.
Figure 15B:
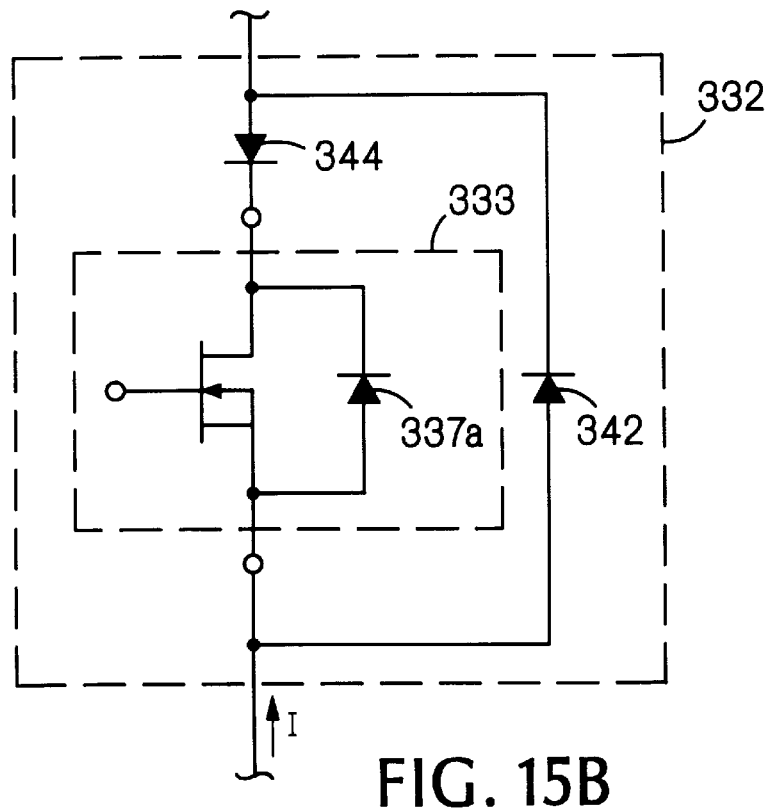

In practice the reset switch 332 may, as shown in FIG. 14, be embodied as a unipolar switch 339 (the direction of conduction of the current Isw being indicated by the arrow) in parallel with a diode 337. If, as shown in FIG. 15A, the switch 332 is embodied as a MOSFET switching device 333, then the intrinsic body diode 337a of the MOSFET device 333 may, under appropriate circumstances, be exploited for use as the diode 337. Suitability of this approach will depend upon the reverse recovery characteristics of the intrinsic body diode (which, for a MOSFET switch, is a function of voltage rating) and the minimum required on-time of the reset switch during the converter operating cycle. For example, the reverse recovery time of the intrinsic body diode of an International Rectifier IRFZ15 MOSFET, having a breakdown voltage rating of 60 Volts, is 140 nanoseconds, maximum, whereas the reverse recovery time of the intrinsic body diode of an International Rectifier IRF710 MOSFET, having a breakdown voltage rating of 400 Volts, is 520 nanoseconds, maximum. The relatively long recovery time of the intrinsic body diode in the cited higher voltage MOSFET would make it unsuitable for use as the diode 337 (FIG. 14) in applications in which the minimum on-time of the reset switch falls below 520 nanoseconds (e.g., in a ZCS converter with a maximum operating frequency around 1 MHz; in most PWM converters at high duty cycles). On the other hand, the faster recovery time of the body diode in the lower voltage MOSFET would allow it to be used in a fairly broad array of applications. In cases where the intrinsic body diode 337 cannot be used as the diode 337, an external diode may be used. FIG. 15B shows a reset switch 332 embodiment using a MOSFET switch 333 and an external diode 342. To prevent conduction by the intrinsic body diode 337a when current is flowing in the external diode 342, a series diode 344 is put in series with the MOSFET switch 333.

Figures 16A, 16B:
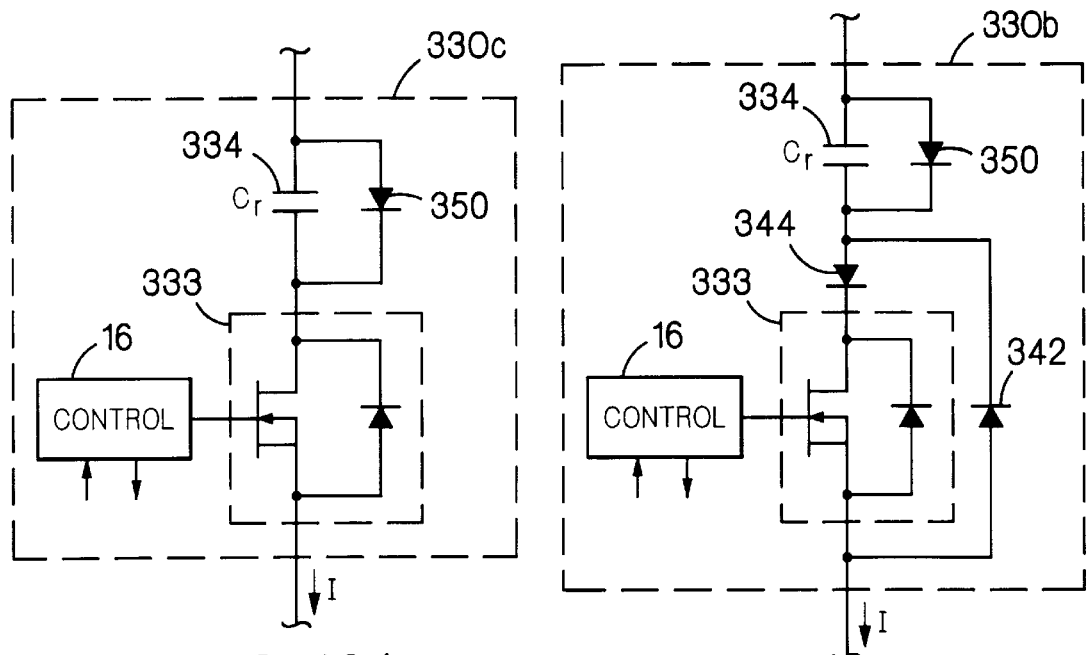
FIGS. 16A through 16C show alternate embodiments of the improved reset circuit topology of FIG. 10.
Figure 16C:
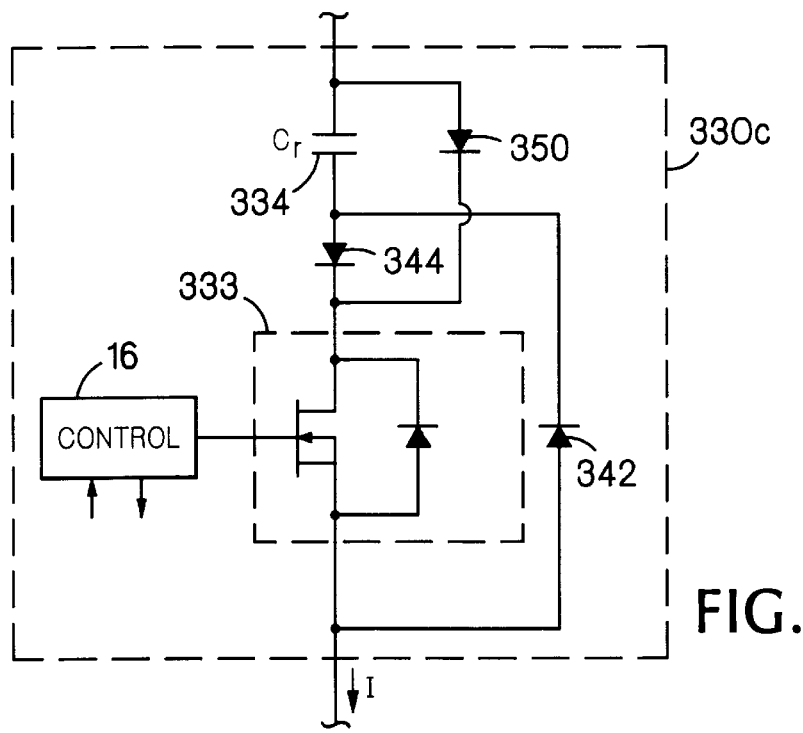

Several embodiments of an improved reset circuit 330a, 330b, 330c are shown in FIGS. 16A through 16C, respectively. In FIG. 16A the improved reset circuit 330a incorporates the MOSFET switch 333 of FIG. 15A into the circuit topology 330 of FIG. 10; in FIG. 16B the improved reset circuit 330b incorporates the MOSFET switch 333 and diodes 342, 344 of FIG. 15B into the circuit topology 330 of FIG. 10. In the embodiment 330c of FIG. 16C, the circuit of FIG. 16B is modified by connecting the cathode of the reset diode 350 directly to the MOSFET switch 333, rather than to the series diode 344 as is done in FIG. 16B. At times at which current is flowing in the reset diode 350, the circuit of FIG. 16C will exhibit lower power loss than that of FIG. 16B, since the current flow in the circuit of FIG. 16C will bypass the series diode 344.

Figure 17A:
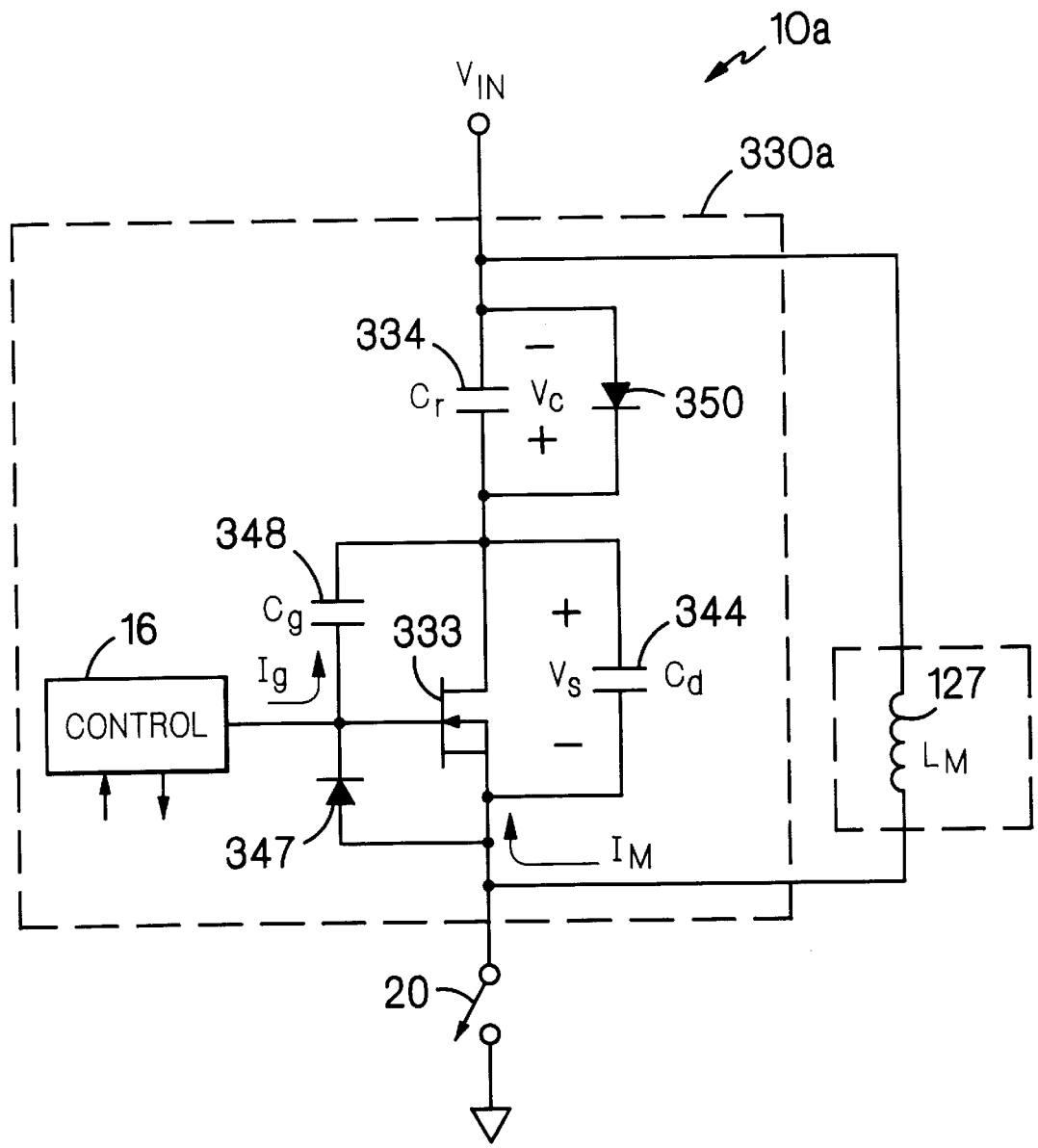
FIGS. 17A and 17B show schematic models of converters which include reset circuits of the kind shown in FIGS. 16A and 16C, respectively.
Figure 17B:
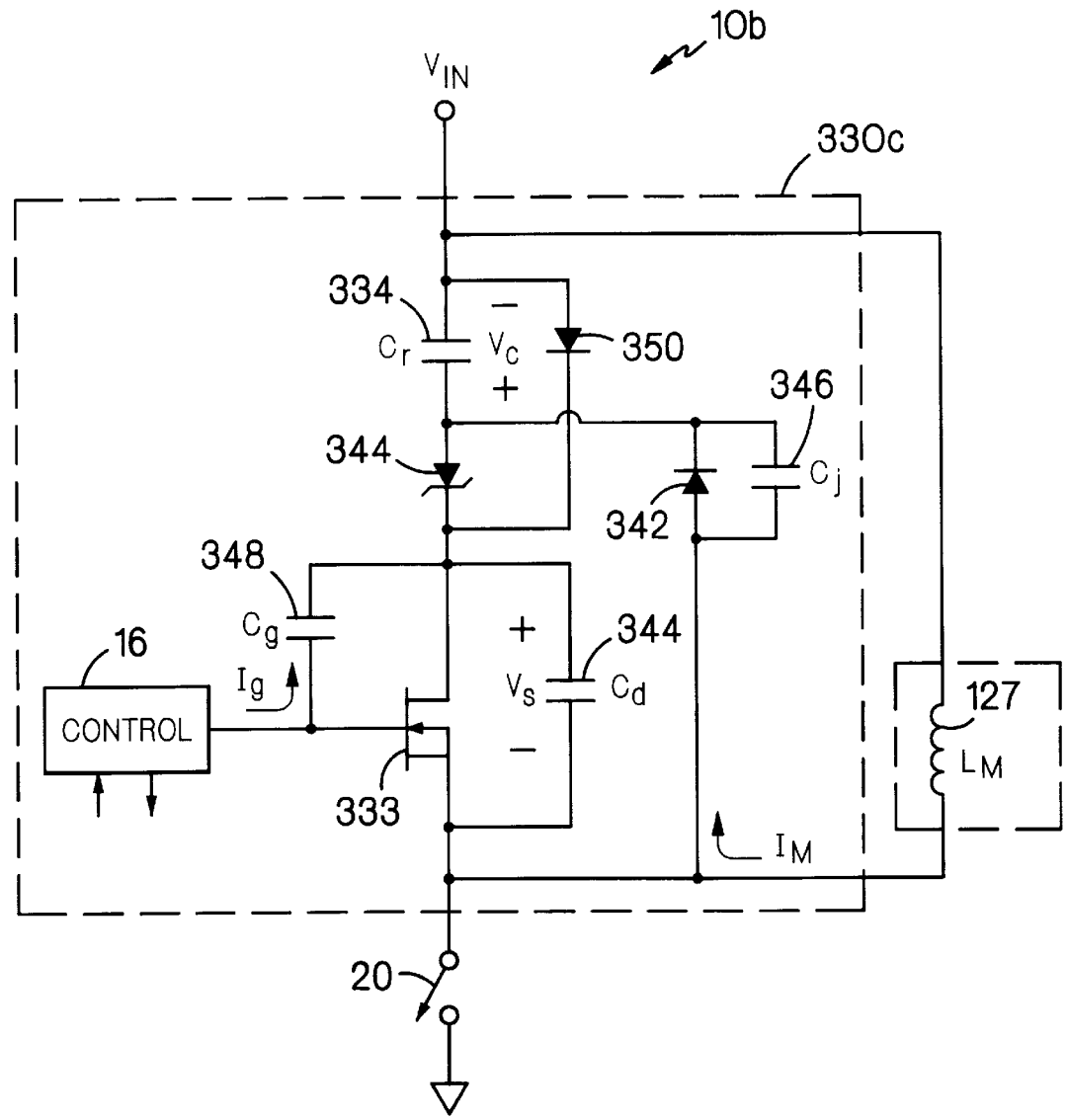

As a practical matter the diode 344 (FIG. 15B, 16B, 16C) should be a device having a relatively low breakdown voltage rating (e.g., a Schottky diode having a low avalanche voltage rating, Vav). One reason for this is that diodes having lower breakdown voltages also have lower forward voltage drops and therefore will result in less circuit loss. Another reason is illustrated with reference to FIGS. 17A and 17B, which show converter circuit models 10a, 10b which include, respectively, reset circuits 330a, 330c of the kind shown in FIGS. 16A and 16C, and inductances 127 which emulate the magnetizing inductance of a transformer. Also indicated in the Figures are certain parasitic capacitances: the drain-to-source capacitance, Cd 344, and the gate-to-drain capacitance, Cg 348, of the MOSFET 333 (the intrinsic body diode is not shown) and, in FIG. 17B, the parasitic junction capacitance, Cj 346, of the external diode 342. We assume that the converter input voltage, Vin, is relatively high (e.g., 300 Volts), that the primary switch 20 has just opened and that magnetizing current, Im, has begun to flow, in the direction indicated, in both reset circuits 330a, 330c. In the circuit of FIG. 17A, the flow of magnetizing current will losslessly discharge both Cg 348 and Cd 344 and then continue to flow in the intrinsic body diode (not shown) of the MOSFET 333. Thus, when the MOSFET is turned on it is done so at essentially zero voltage and switching losses are essentially eliminated. In the circuit of FIG. 17B, however, if the series diode 344 has a high breakdown voltage rating, then the flow of magnetizing current, Im, will discharge the junction capacitance 346 of the external diode 342 but the blocking action of the series diode 344 will prevent discharging of the capacitances Cg 348 and Cd 344 of the MOSFET 333. These capacitances will remain charged to a voltage equal to Vin+Vc, where Vc is the value of the reset capacitor 334 voltage at the time that the switch 20 is turned off. When the reset MOSFET 333 is subsequently turned on, the energy stored in these capacitances will be dissipated in the MOSFET as switching losses. If however, the diode 344 has a low breakdown voltage (e.g., 20 Volts) then the diode 344 will avalanche when Im begins to flow in the reset circuit 330c and the capacitances 344, 348 will be discharged until the voltage across the MOSFET (e.g., the voltage across capacitor 344) falls below the breakdown voltage, Vav, of the diode 344, at which point the diode will come out of avalanche and cease conducting. Since Vav is much lower than Vin+Vc the amount of switching loss is substantially reduced. The same reasoning applies to the circuit embodiment of FIG. 16B, which will also benefit from use of a series diode 344 having a low breakdown voltage rating.

The breakdown voltage rating, Vav, of the series diode 344 should not be made too low, however. As the drain-source voltage, Vs, across the MOSFET (FIGS. 17A, 17B) drops, the value of the equivalent gate-to-drain capacitance, Cd 344, goes up. This will result in an increase in the parasitic gate current Ig as the value of Vav falls. In practice, allowing the voltage to decline to near zero volts (e.g., as would happen in the circuit of FIG. 17A) can result in substantial transient values of Ig (e.g., to approximately 2 Amperes for a HEX1 size MOSFET die in a 200 Watt ZCS converter). The flow of Ig can disrupt control circuitry 16 connected to the FET gate. By keeping Vav at a suitable value (e.g., 20 V) this problem can be avoided with minimal increase in switching losses. In reset circuits 330a of the kind shown in FIG. 17A, where the series diode is not used, the flow of Ig may be bypassed around the control circuitry 16 by adding a high-speed diode 347 (e.g., a Schottky diode) across the gate-to-source terminals of the MOSFET.

Controlling the reset switch 332 (FIG. 10) in the improved reset circuit 330 is essentially the same as controlling the switch 32 in the prior art converter of FIG. 3. The reset switch 332 must be turned on after the primary switch 20 opens and must be off when the primary switch closes. If a reset switch of the kind shown in FIGS. 14 and 15 is used, the timing of the closure of the reset switch is not critical since the diode (337, FIG. 14) will begin to conduct magnetizing current Im as soon as the current commutates into the reset circuit 330. Delay between opening of the primary switch 20 and closure of the reset switch 332 will not affect circuit operation provided only that the reset switch is ready to conduct current when the current eventually reverses and the diode becomes non-conductive (e.g., the switch must be conductive at and after time t=tx in FIGS. 4C, 5D, 7B, 9D, 11B). On the other hand, closure of the reset switch must not be allowed to occur while the primary switch is conductive as this can cause catastrophic failure of the converter. Therefore it is beneficial to provide means for sensing that the primary switch 20 has opened and enable closure of the reset switch only when this signal is present.

Figure 18B:
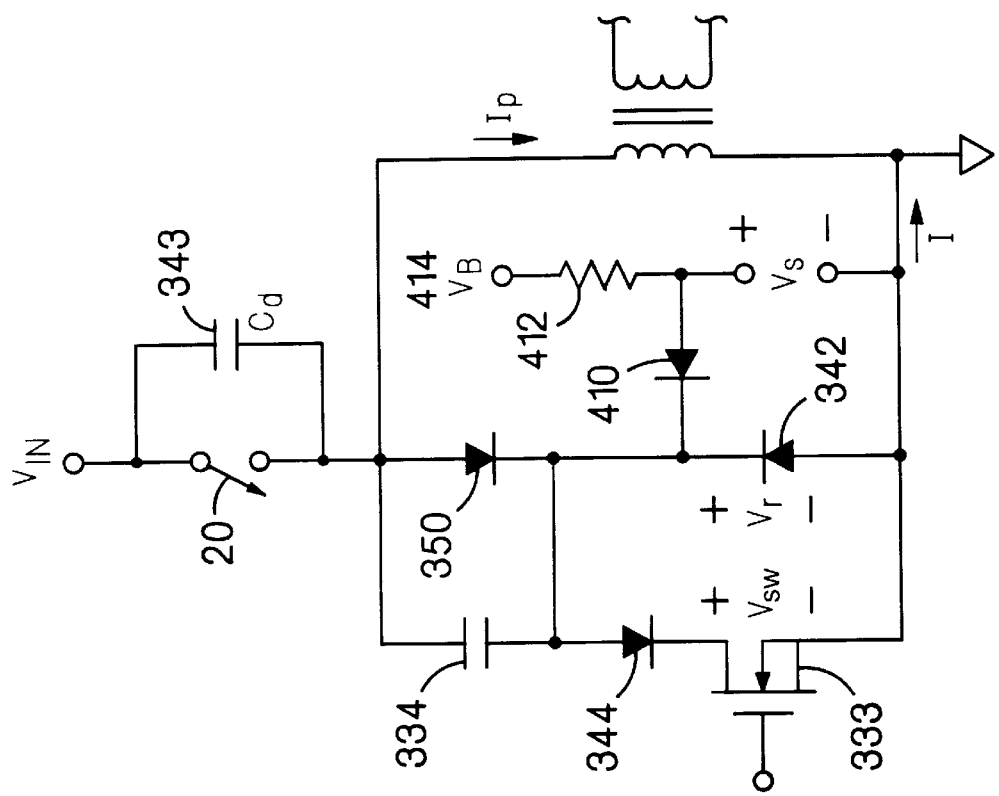
FIGS. 18A and 18B show circuit schematics illustrating ways to sense when the primary switch has become non-conductive.
Figure 18A:
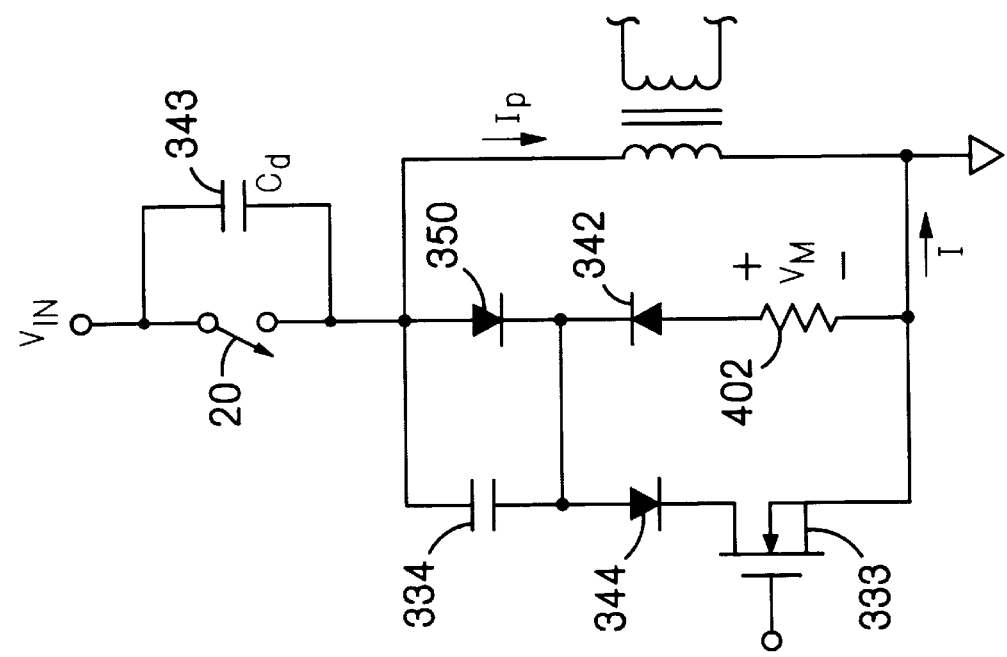

Ways to sense the state of the primary switch are shown in FIGS. 18A and 18B. In the Figures a reset circuit of the kind shown in FIG. 16B is shown connected to a transformer 25 and a primary switch 20. In FIG. 18A a sense resistor 402, of a relatively small value Rs, is connected in series with the diode 342. When the primary switch 20 opens and magnetizing current begins flowing, as a negative flow of the current I, in the diode 342 the voltage, Vm, across the resistor will go negative and this may be used to sense that the primary switch is no longer conductive. One drawback of the method of FIG. 18A is that the use of the resistor will cause power loss.

A preferred method for sensing the state of the primary switch as a means of safely enabling the reset switch is shown in FIG. 18B. In the Figure a diode 410, a large value resistor 412 and bias source 414, of voltage Vb <Vin, are used as sensing elements. Prior to opening the primary switch (e.g., prior to time t=tm in FIGS. 19A and 19B) the voltage, Vr, across the diode 342 is greater than Vin, the diode 410 is reverse biased and Vs=Vb. At time t =tm, when the primary switch 20 becomes non-conductive, the magnetizing current begins flowing, as a negative flow of current I, in diode 342 and the sense voltage, Vs, drops to a small voltage value, Vz, equal to the difference between the drops in the two diodes 342, 410 (which may be assumed to be close to zero volts). The drop in Vs may be sensed as an indicator that the primary switch has opened.

With reference to FIG. 7, it has already been noted that premature initiation of primary switch turn-on can cause transformer 25 saturation, and that this possibility requires that control be asserted over maximum converter slew rate. One way to do this is to sense the magnetizing current during the reset interval, and inhibit initiation of the next converter operating cycle (e.g., the next turn-on of the primary switch) until the magnetizing current is deemed to be at a safe level. In one example of setting acceptable criteria for enabling turn-on of the main switch, we note that during the first few operating cycles following application of input power to a typical power converter the variation in magnetizing current will not be symmetrical about zero current, but will, during the time the primary switch is turned on, increase from essentially zero current up to absolute values which can equal ΔIpmax (FIGS. 7, 19). As a result, the transformer is typically designed to be able to withstand at least this absolute value of current without saturating. Therefore, with reference to FIGS. 7 and 19, it would be safe to turn the primary switch on at any time after time t=tx as this will ensure that the absolute value of magnetizing current during the next cycle will not exceed ΔIpmax. Use of a strategy of this kind will automatically control the slew rate of the converter in such a way that maximum slew rates are always achieved consistent with safe converter operation.

Figures 19A, 19B:
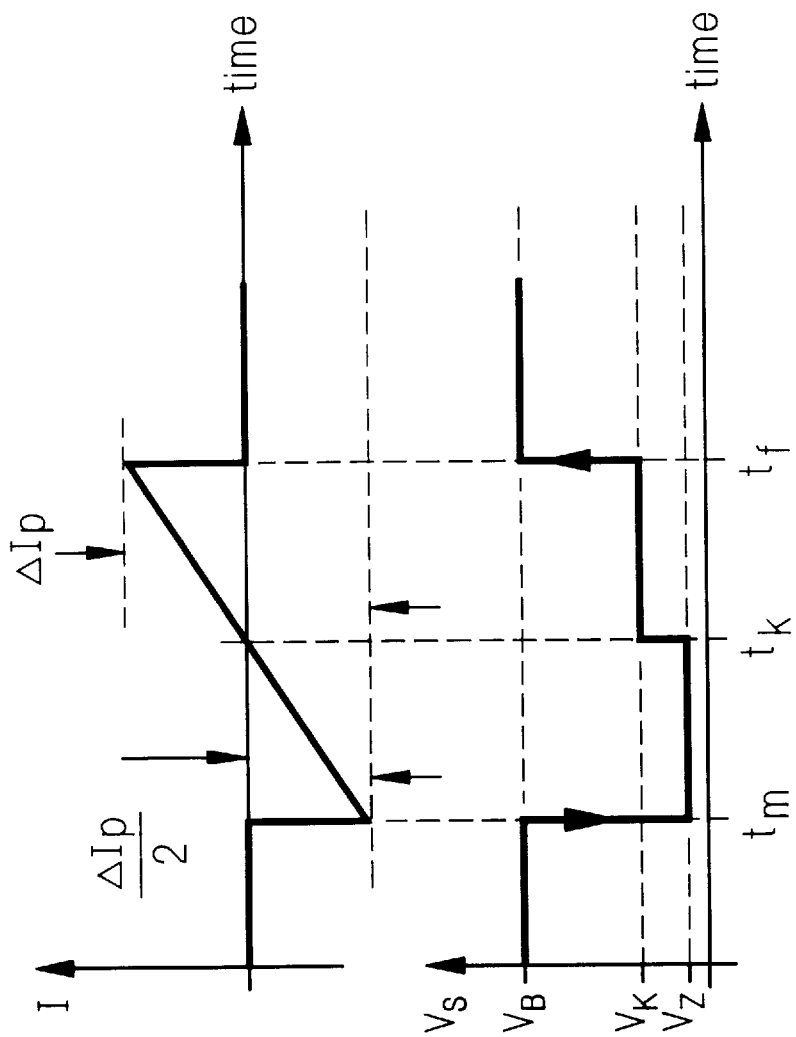
FIGS. 19A and 19B show waveforms for the circuit of FIG. 18B.

One way of sensing the magnetizing current is to measure it directly, as is done in the circuit of FIG. 18A in which the voltage Vm=I*Rs. Slew rate may be controlled by comparing Vm to some set of predetermined safe operating criteria, and inhibiting or enabling primary switch turn-on based upon that comparison. Alternatively, a measurement indicative of the value of magnetizing current may also be used. For example, the circuit of FIG. 18B may be used to derive a signal which indicates when the magnetizing current crosses through zero. With reference to FIG. 19B, at time t=tx, the magnetizing current has increased by ΔIp/2 and is crossing through zero. At this time, the switch 333 begins to carry the current and the voltage Vs increases to a value Vk, which is more positive than Vz and approximately equal to the voltage drop across the switch, Vsw. Assuming that the converter transformer can accommodate an absolute value of magnetizing current equal to ΔIp, the increase in the voltage Vs at time t=tx may be used to indicate that it is safe to enable initiation of the next converter operating cycle.

Figure 21A:
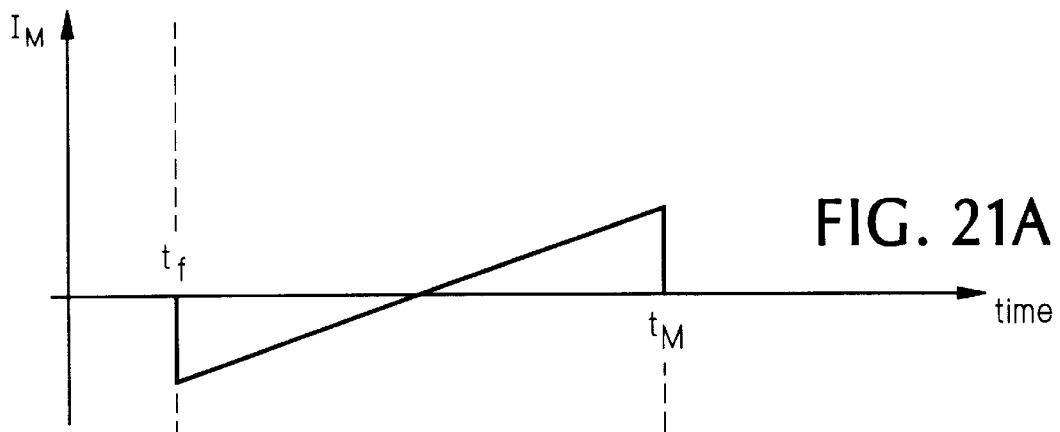
FIGS. 21A through 21C show current waveforms for a ZCS converter.
Figure 21B:
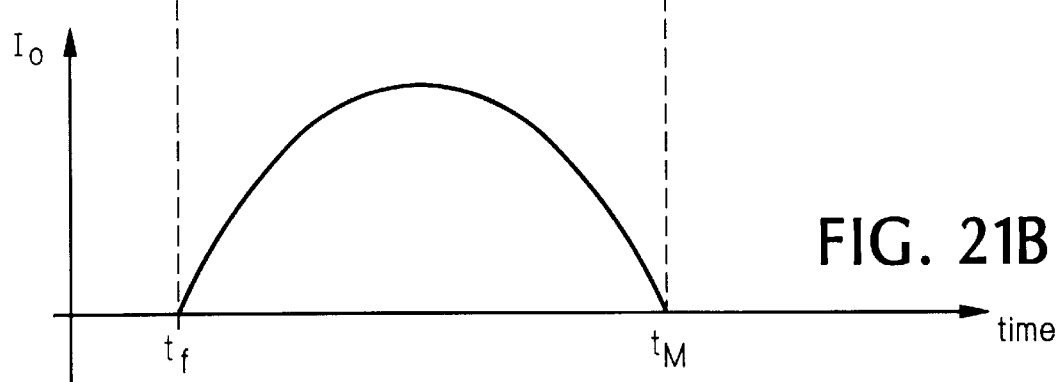
Figure 21C:
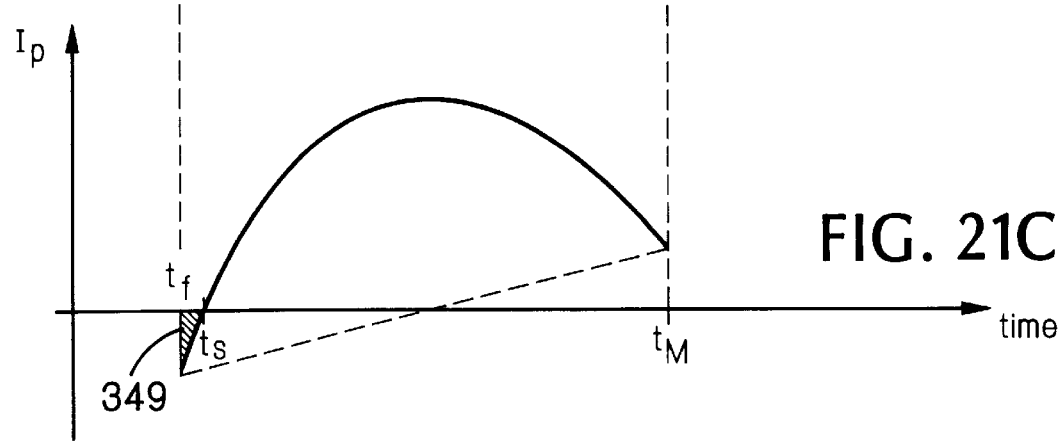

It is also to be noted that, if the magnetizing current is scaled properly, operation of the reset circuit may be exploited to allow the primary switch to be switched on at zero-voltage. Assume, for example, that the circuits of FIGS. 18A or 18B form a portion of a ZCS converter, that the primary switch 20 is of the kind described with reference to FIG. 14 above, that the primary switch 20 has a parasitic capacitance Cd 343, and that the reset switch 333 (FIG. 18) is opened at time t=tf (e.g., as in FIG. 19). At t=tf, magnetizing current will be flowing as a negative flow of transformer primary current Ip. Following time t=tf, the current which flows in the transformer primary, Ip, will, as shown in FIGS. 21A through 21C, consist of a magnetizing current component, Im, and a forward current component, Io (e.g., in a ZCS converter, as shown in FIG. 21B, Io is the approximately sinusoidal portion of the transformer primary current which is reflected into the secondary winding). Between time t=tf and t=ts, the primary current, Ip, is negative, and this flow of negative current will discharge the parasitic capacitance 343 of the primary switch 20 if the switch is off. If the relative scales of Im and Io are such that the total charge transferred between times tf and ts (as indicated by the shaded area 349 in FIG. 21C) is greater than the charge stored in the parasitic capacitance, Cd 343, then Cd can be discharged to zero volts prior to the time at which Ip becomes positive. Once Cd is discharged the switch may be turned on with virtually no switching loss. For a primary switch of the kind shown in FIG. 14 (e.g., a MOSFET), a turn-on strategy for minimizing switching losses would be to delay turning the primary switch on until Ip has discharged Cd and has begun to flow in the intrinsic body diode (or external diode, if used) of the primary switch. Sensing of the flow of current in the diode (using, for example, the techniques illustrated in FIG. 18) may be used to initiate turn-on of the primary switch.

Figure 20:
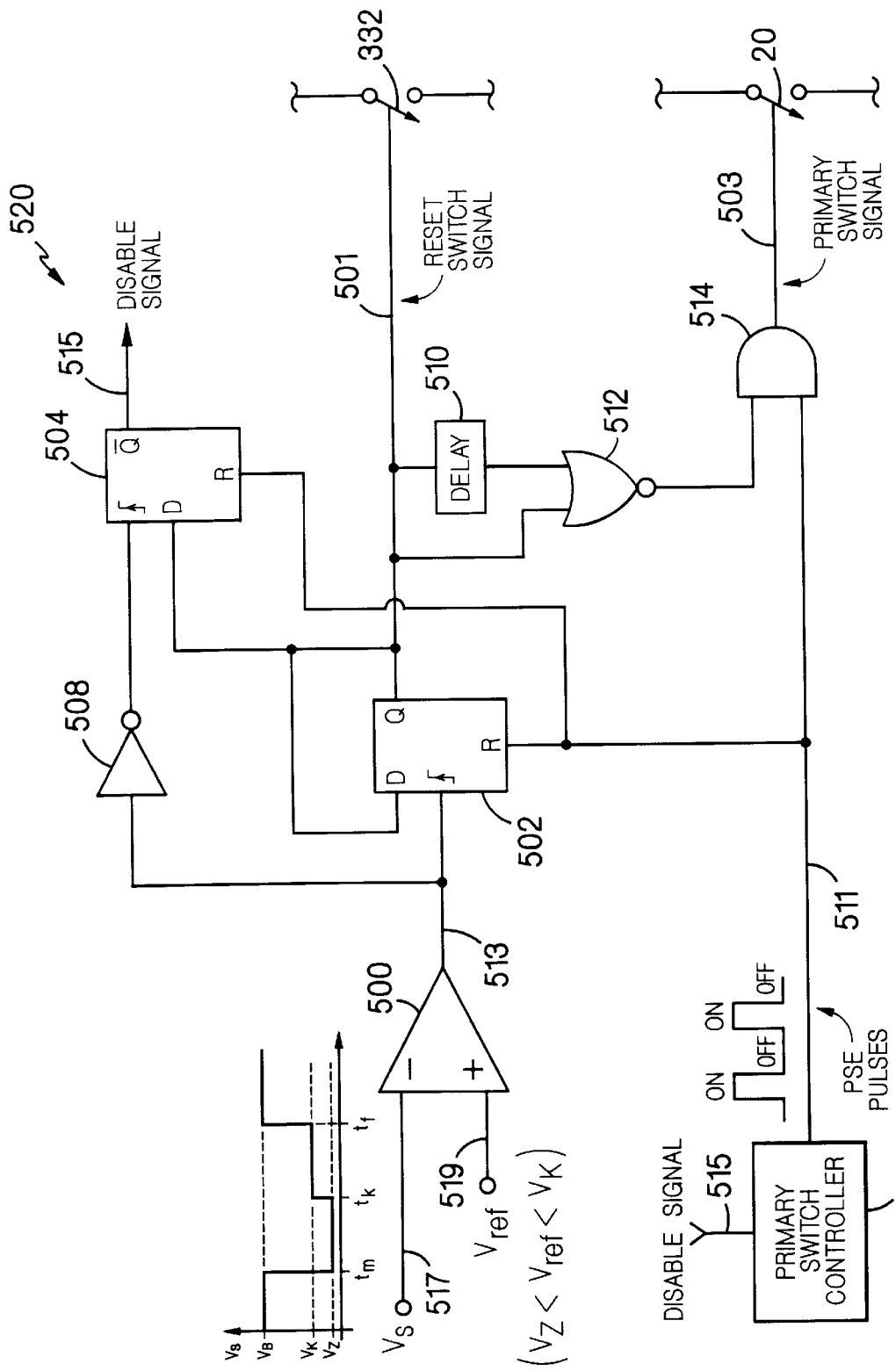
FIG. 20 is a circuit schematic of a reset switch controller.

FIG. 20 shows a reset switch controller 520 which incorporates some of the features described above. A primary switch controller 530 delivers Primary Switch Enable (MS) pulses 511 indicating when the primary switch 20 is to be turned on. Assuming that the reset switch 332 is turned on (e.g., the Reset Switch signal output of flip-flop 502 is high), delivery of a PSE pulse will cause both flip-flops 502, 504 to be reset via their reset inputs. This will cause the Reset Switch signal 501 to go low, initiating turn-off of the reset switch, and will also cause the Disable signal 515 to go high. While the Disable pulse has no effect on the PSE Pulse 511 currently being generated, the Primary Switch Controller 530 will not deliver another PSE pulse unless the Disable signal 515 is low. A short time after the Reset Switch Signal 501 goes low, the output of the Delay element 510 also goes low and the output of NOR gate 512 goes high, enabling gate 514 and allowing the Primary Switch signal 503 to go high. The result is that the primary switch 20 is turned on a short time after the reset switch is turned off. The dead time is determined by circuit propagation times and the delay introduced by delay element 510—in a typical 1 Mhz ZCS converter the delay might be a few tens of nanoseconds. Provided that the delay is relatively short, its value is non-critical since the transformer magnetizing current which flows during the dead time will beneficially charge parasitic capacitances associated with both switches.

When the PSE pulse ends the output of gate 514 goes low, turning off primary switch 20. When the switch becomes non-conductive at time t=tm the signal Vs 519 (discussed above with reference to FIG. 19) drops low. Comparator 500 compares Vs to a reference voltage, Vref, where Vz<Vref<Vk. Thus, the comparator output signal 513 goes high at essentially time t=tm setting the Reset Switch signal 501 output of flip-flop 502 and causing the reset switch 332 to turn on. Some time later, at t=tx, as also discussed above, the magnetizing current crosses zero and the voltage Vs increases to a value greater than Vref. This causes the output of the comparator 500 to go low, bringing the Disable signal low. This, in turn, signals the primary switch controller 530 that it is safe for it to deliver a subsequent PSE pulse 511.

Some time later (e.g., at approximately time t=tf) another PSE pulse is generated and the cycle is repeated.

Other embodiments are within the scope of the following claims. For example, the topologies and circuits described above may be adapted for use in other than single-ended converters (e.g.; full bridge or half-bridge converters).

What is claimed is:

1. A method for limiting the slew rate in a switching power converter which includes a transformer and a reset circuit of the kind which non-dissipatively recycles the magnetizing energy stored in a transformer during each of a succession of converter operating cycles, said method comprising sensing the magnetizing current which is flowing in said transformer, and allowing initiation of another converter operating cycle only if the magnetizing current meets a predefined criterion for converter operation.

2. The method of claim 1 wherein said predefined criterion comprises the magnetizing current passing through a predefined value.

3. The method of claim 1 wherein said predefined criterion comprises the magnetizing current crossing through zero.

4. Apparatus for use in a switching power converter of the kind which delivers power from a DC input source to a load via a transformer and which has a primary switch for connecting said DC input source to a primary winding of said transformer during a portion of each of a succession of converter operating cycles, said apparatus comprising:

reset circuitry including
a capacitor leg;
a series circuit connected between said capacitor leg and said transformer, said series circuit providing the only substantial path for completing a circuit comprising said capacitor leg and said transformer;
said series circuit comprising switch circuitry which enables current flow between said capacitor leg and said transformer through said series circuit during a closed state and inhibits current flow between said capacitor leg and said transformer through said series circuit during an open state; and
additional circuitry connected to said capacitor leg which allows a current having a non-zero average value to flow in said series circuit;
said reset circuitry resets said transformer by transferring energy stored in said transformer to said capacitor leg and back to said transformer without returning energy to said DC input source.

5. The apparatus of claim 4 wherein said switch circuitry enters said open and said closed states at times based on switching of said primary switch.

6. The apparatus of claim 4 wherein said switch circuitry is connected in series with said capacitor leg.

7. The apparatus of claim 4 wherein said additional circuitry includes circuit elements connected to allow magnetizing energy to be transferred between said transformer and said capacitor leg only if the voltage across said capacitor leg is of a particular polarity.

8. The apparatus of claim 4 wherein said additional circuitry includes circuit elements connected to inhibit bidirectional energy flow between said capacitor leg and said transformer.

9. The apparatus of claim 4 connected across a winding of said transformer.

10. The apparatus of claim 9 wherein said winding comprises said primary winding.

11. The apparatus of claim 9 wherein said winding comprises a secondary winding.

12. The apparatus of claim 9 wherein said winding comprises an auxiliary winding.

13. The apparatus of claim 4 wherein said switch circuitry comprises a unidirectional switch connected in parallel with a unidirectional conducting element, said unidirectional switch and said unidirectional conducting element being arranged to conduct in opposite directions.

14. The apparatus of claim 13 wherein said unidirectional switch comprises a MOSFET.

15. The apparatus of claim 14 wherein said unidirectional conducting element comprises the intrinsic body diode of said MOSFET.

16. The apparatus of claim 13 wherein said unidirectional switch comprises a MOSFET in series with a series diode, said series diode and said MOSFET being poled to conduct in the same direction.

17. The apparatus of claim 7 or 8 wherein said circuit elements comprise a reset diode connected in parallel with said capacitor leg.

18. The apparatus of claim 8 wherein said bidirectional energy flow is allowed only if the voltage across said capacitor leg is of a particular polarity.

19. The apparatus of claim 7 or 8 wherein said particular polarity is that which will result in a reversal in the polarity of transformer magnetizing current during said closed state.

20. The apparatus of claim 16 wherein said additional circuitry includes circuit elements which inhibit bidirectional energy flow between said capacitor leg and said transformer and wherein said circuit elements comprise a reset diode connected across a series circuit comprising said reset capacitor and said series diode.

21. The apparatus of claim 4 wherein said switching power converter comprises a forward power converter.

22. The apparatus of claim 4 wherein said switching power converter comprises a zero-current switching converter.

23. The apparatus of claim 4 wherein said switching power converter comprises a PWM converter.

24. The apparatus of claim 4 wherein said switch circuitry enters said open state prior to the ON period of said primary switch.

25. The apparatus of claim 4 wherein said switch circuitry enters said closed state during the OFF period of said primary switch.

26. The apparatus of claim 4 wherein said switch circuitry remains in said open state throughout the ON period of said primary switch.

27. The apparatus of claim 4 wherein said primary switch connects said DC input source to said primary winding essentially coincidentally with said switch circuitry entering said open state.

28. The apparatus of claim 4 wherein said primary switch connects said DC input source to said primary winding a finite delay after said switch circuitry enters said open state.

29. The apparatus of claim 28 wherein said finite delay accommodates charging and discharging of capacitances in said converter.

30. The apparatus of claim 29 wherein said capacitances comprise parasitic capacitances.

31. The apparatus of claim 29 wherein said capacitances are associated with said primary switch.

32. The apparatus of claim 29 wherein said capacitances are associated with said switch circuitry.

33. The apparatus of claim 29 wherein said capacitances are associated with windings in said transformer.

34. The apparatus of claim 4 further comprising:

slew control circuitry for inhibiting initiation of a converter operating cycle based upon the value of a magnetizing current in said transformer.

35. Apparatus for use in a switching power converter of the kind having a transformer for transferring energy from a DC input source to a load during a forward energy transfer portion of a succession of converter operating cycles, and a primary switch for connecting said DC input source to a primary winding of said transformer during said forward energy transfer portions, the apparatus comprising:

a reset capacitor;

a series circuit connected between said reset capacitor and said transformer, said series circuit providing the only substantial path for completing a circuit comprising said reset capacitor and said transformer;

said series circuit comprising a reset switch; and reset circuitry which cooperates with said series circuit to connect and disconnect said reset capacitor in a manner which provides for resetting a core of said transformer, and allows a current having a non-zero average value to flow in said series circuit, said reset circuitry including a reset diode connected in parallel with said reset capacitor to inhibit polarity reversal of the voltage across said capacitor.

36. A reset method for use in a switching power converter of the kind having a transformer, a primary switch for connecting a DC input source to a winding of the transformer during a portion of each of a succession of converter operating cycles, a reset capacitor, and a series circuit connected between said reset capacitor and said transformer, said series circuit providing the only substantial path for completing a circuit comprising said reset capacitor and said transformer;

said series circuit comprising a reset switch which enables current flow between said reset capacitor and said transformer through said series circuit in a closed state and inhibits current flow between said reset capacitor and said transformer through said series circuit in an open state, said method comprising connecting and disconnecting said reset capacitor in a manner which provides for resetting said transformer and which allows a current having a non-zero average value to flow in said series circuit.

37. The method of claim 36 wherein the operation of said primary switch occurs substantially coincident with disconnecting said reset capacitor.

38. The method of claim 36 wherein the operation of said primary switch occurs a finite delay after said reset capacitor is disconnected.

39. Switching power converter apparatus comprising:

a DC input source;

a transformer having a primary winding;

a primary switch for connecting said DC input source to said primary winding during a portion of each of a succession of converter operating cycles;

a reset capacitor;

a series circuit connected between said reset capacitor and said transformer, said series circuit providing the only substantial path for completing a circuit comprising said capacitor leg and said transformer;

said series circuit comprising a reset switch; and reset circuitry, including a reset diode connected in parallel with said reset capacitor to inhibit polarity reversal of the charge stored by said capacitor, said reset circuitry cooperating with said reset switch to connect and disconnect said reset capacitor in a manner which provides for resetting a core of said transformer, and allows a current having a non-zero average value to flow in said series circuit.

40. A power supply method comprising the steps of:

initiating energy transfer from a DC input source to a load via a transformer by connecting said DC input source to a winding of said transformer during a forward energy transfer portion of each of a succession of converter operating cycles;

resetting said transformer during each of said converter cycles by providing for energy transfer between said transformer and a reset capacitor during a second portion of said converter operating cycles such that the flux in the transformer is reversed; and selectively shunting said reset capacitor to prevent polarity reversal of the voltage across said reset capacitor.

41. The method of claim 40 wherein the initiation of said step of initiating energy transfer essentially coincides with completion of a previous said step of resetting said transformer.

42. The method of claim 40 further comprising the step of imposing a finite delay after performing said step of resetting said transformer and before commencing said step of initiating energy transfer.

43. The method of claims 38 or 42 wherein said finite delay accommodates charging and discharging of capacitances.

44. The method of claim 43 wherein said capacitances comprise parasitic capacitances.

45. The method of claim 44 wherein said capacitances are associated with at least one switch.

46. The method of claim 44 wherein said capacitances are associated with at least one winding of said transformer.

* * * * *